US008768737B1

(12) United States Patent
Solomon et al.

(10) Patent No.: US 8,768,737 B1
(45) Date of Patent: Jul. 1, 2014

(54) SCHEDULE MANAGEMENT INTERFACE

(71) Applicant: PagerDuty, Inc., San Francisco, CA (US)

(72) Inventors: Dan Alexandru Solomon, San Francisco, CA (US); John Gary Ryan Laban, Vancouver (CA); Ian Alexander Enders, San Francisco, CA (US); Ali Basiri, Santa Clara, CA (US); Andrew Gregory Miklas, San Francisco, CA (US)

(73) Assignee: PagerDuty, Inc., San Francisco, CA (US)

( * ) Notice: Subject to any disclaimer, the term of this patent is extended or adjusted under 35 U.S.C. 154(b) by 0 days.

(21) Appl. No.: 13/830,644

(22) Filed: Mar. 14, 2013

Related U.S. Application Data

(60) Provisional application No. 61/745,338, filed on Dec. 21, 2012.

(51) Int. Cl.
*G06Q 10/00* (2012.01)

(52) U.S. Cl.
USPC ........................................ 705/7.13; 705/7.12

(58) Field of Classification Search
USPC ................................. 705/7.12, 7.13
See application file for complete search history.

(56) References Cited

U.S. PATENT DOCUMENTS

| | | | | |
|---|---|---|---|---|
| 7,958,457 B1 * | 6/2011 | Brandenberg et al. | ........ | 715/789 |
| 2007/0087756 A1 * | 4/2007 | Hoffberg | ...................... | 455/450 |
| 2008/0027783 A1 | 1/2008 | Hughes et al. | | |
| 2008/0147472 A1 * | 6/2008 | Hitz | ................................... | 705/9 |
| 2008/0177994 A1 | 7/2008 | Mayer | | |
| 2009/0182611 A1 * | 7/2009 | Iknoian | ............................. | 705/9 |
| 2011/0184772 A1 * | 7/2011 | Norton et al. | ................ | 705/7.18 |
| 2011/0320230 A1 * | 12/2011 | Podgurny et al. | ............ | 705/7.13 |
| 2013/0148798 A1 * | 6/2013 | Ellsworth et al. | ............. | 379/133 |

OTHER PUBLICATIONS

Official Communication for U.S. Appl. No. 13/843,544 mailed Sep. 3, 2013.
Official Communication for U.S. Appl. No. 13/843,544 mailed Jan. 30, 2014.

* cited by examiner

*Primary Examiner* — Thomas L Mansfield, Jr.
(74) *Attorney, Agent, or Firm* — John W. Branch; Lowe Graham Jones PLLC

(57) ABSTRACT

Embodiments are directed towards generating schedules for managing team members that may be responsible to be on-call for responding to incidents. Schedules may be configured to schedule team members and manage the rotation of one or more team members assigned to one or more schedule layers. Also, schedules may be employed to determine which team member may be responsible to respond and/or resolve incidents that may be reported and/or detected. If a team member is determined to be the on-call or responsible team member, a notification engine may determine the methods for notify the responsible of the incidents. Further, the notification engine may monitor whether the responsible team has received the notification. The notification engine may employ one or more other notification methods to ensure that the responsible team member may be notified.

30 Claims, 15 Drawing Sheets

| | Sun | Mon | Tues | Wed | Thurs | Fri | Sat |
|---|---|---|---|---|---|---|---|
| Wk 1 | A | B | C | D | A | B | C |
| Wk 2 | D | A | B | C | D | A | B |
| Wk 3 | C | D | A | B | C | D | A |
| Wk 4 | B | C | D | A | B | C | D |

| Team 1 |
|---|
| Adam |
| Bruce |
| Chris |
| Doris |

*FIG. 4*

SCHEDULE MANAGEMENT INTERFACE

CROSS-REFERENCE TO RELATED APPLICATION(S)

This application is a utility patent application based on previously filed U.S. Provisional Patent Application Ser. No. 61/745,338 filed on Dec. 21, 2012, the benefit of which is hereby claimed under 35 U.S.C. §119(e) and incorporated herein by reference.

TECHNICAL FIELD

The present invention relates generally to computer automated scheduling and notification of resources and more particularly, but not exclusively to generating schedules and that include rotating the included resources over varying the time periods and sending notifications to the resources.

BACKGROUND

Information technology has become an increasingly important and indispensable component required for the operation of most modern enterprises. This increased dependency on information technology often requires dedicated support resources be readily accessible to resolve planned or unplanned incidents that may affect the operation the information technology infrastructure. Accordingly, it may be important to identify the support resources that may be responsible for resolving the incidents. Likewise, it may be necessary to deliver notifications regarding these and other incidents to the appropriate support resources. For example, those persons and/or organizations that may be responsible for monitoring and/or resolving problems that may be associated with the incidents.

In some cases, support resources may be organized into one or more teams having one or more team members. At any given time, one or more team members may be responsible for providing support and/or responding to incidents for various portions of the information technology infrastructure. As information technology infrastructure increases in importance, complexity, and size, resources such as the number of support teams and/or support team members may increase as well. For such expansive and complex infrastructure, generating schedules for determining which resources may be responsible for responding to incidents may also be complex and difficult. Likewise, ensuring that the proper resource may be notified if incidents occur may be grow more complex and/or unreliable as the schedules become more complex. Thus, it is with respect to these considerations and others that the present invention has been made.

BRIEF DESCRIPTION OF THE DRAWINGS

FIG. 4 shows a logical schematic of a schedule in accordance with at least one of the various embodiments;

DETAILED DESCRIPTION OF THE VARIOUS EMBODIMENTS

Figure 1:
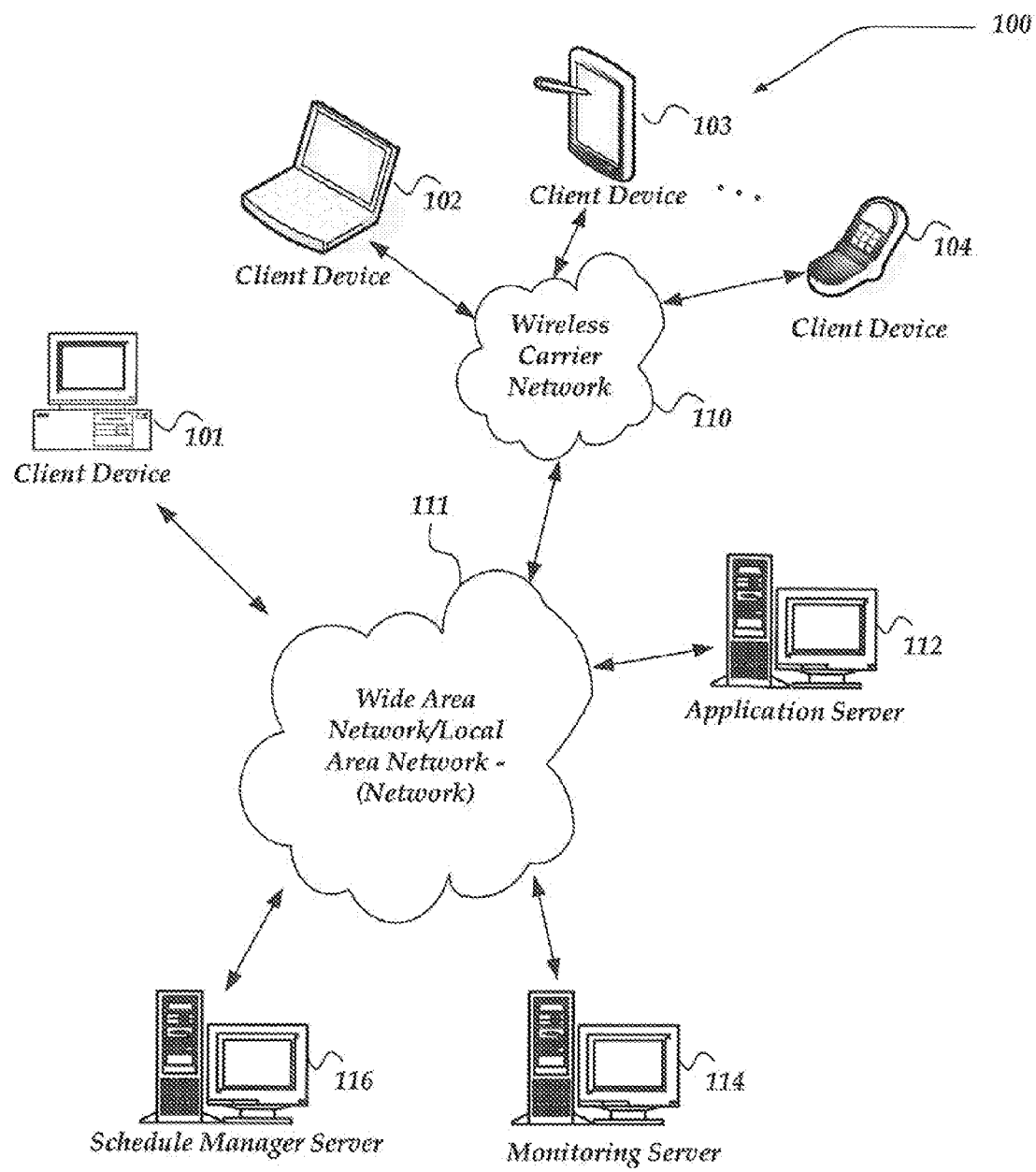
FIG. 1 is a system diagram of an environment in which at least one of the various embodiments may be practiced.

Various embodiments now will be described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

The term "team member" as used herein refers to a person and/or resource that may be assigned one or more time periods and/or shift where the team member is considered the responsible team member. Responsible team members may be considered to be on-call and/or active during the period time designated by the schedule.

The term "schedule layer" as used herein refers to a data component that is employed by a scheduling application to generate schedule entries. In at least one of the various embodiments, a schedule layer is at least one way to represent an on-call rotation for a schedule. Each schedule layer may be associated with various properties that may used to generate schedule entries and schedules, including, a set of team members, a shift duration, a precedent value, one or more restrictions, a start time, an on-call handoff time, or the like. The on-call handoff time may be employed to establish a wall-clock starting time for each shift of the rotation that may be associated with a schedule layer. One or more schedule layers may be employed to generate schedule entries that may contribute to a final schedule.

The term "schedule entry" as used herein refers to a data structure that includes a determined time range and an assigned team member. In at least one of the various embodiments, schedule entries may be generated from schedule layers.

The term "final schedule" as used herein refers to a data structure that is in part comprised of final schedule entries generated from the schedule layers that may be included in a schedule. In at least one of the various embodiments, final schedules may be generated for a particular duration such as, three days, two weeks, a month, the-next-two-weeks, or the like.

The term "final schedule entry" as used herein refers to a schedule entry that constitutes a portion of a final schedule.

The term "restriction" as used herein refers to constraints/conditions associated with a schedule layer. They may be for determining if a schedule layer is active or inactive at a given time.

The term "schedule" as used herein refers to the one or more data structures that include, the schedule layers, team members, shift durations, start and stop time, archived schedule entries, or the like, that make a complete schedule. Schedules may be named by users.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards generating schedules for managing team members that may be responsible to be on-call for responding to incidents that may occur. In at least one of the various embodiments, these schedules may be configured to schedule team members and manage the rotation of on-call schedules for one or more team members assigned to one or more schedule layers. In at least one of the various embodiments, the schedules may be employed to determine which team member may be responsible to respond and/or resolve incidents that may be reported and/or detected. In at least one of the various embodiments, if a team member is determined to be the on-call or responsible team member, the notification engine may determine the methods for notify the responsible of the incidents. Further, in at least one of the various embodiments, the notification engine may monitor whether the responsible team has received the notification. If the notification message is not acknowledged by the responsible team member, the notification engine may employ other notification methods in an attempt to ensure that the responsible team member is notified. In some cases, the notification engine may determine that a notification message should be sent to one or more additional team members.

In at least one of the various embodiments, schedules may be comprised of one or more schedule layers. The schedule layers may be configured to generate schedule entries that may be saved into the schedule layer. The schedule entries included in the various schedule layers may be combined to generate a final schedule layer, itself comprised of non-overlapping final schedule entries. In at least one of the various embodiments, schedule layers may be comprised of configured formulas and data that may be employed to generate the schedule entries that may be combined into a final schedule.

In at least one of the various embodiments, each schedule layer may include properties such as, start time, virtual start time, end time, shift duration, team members, precedent values, restrictions, on-call handoff time, or the like. In at least one of the various embodiments, the schedule layer properties may be employed to generated schedule entries. In at least one of the various embodiments, the generated schedule entries may include properties such as, resource/team member ID, start time, end time, or the like. In at least one of the various embodiments, each schedule entry may be employed to determine the particular team member that may be responsible/active at a particular time.

In at least one of the various embodiments, if determining a responsible team member, the scheduling application uses a final schedule which is comprised of final schedule entries. In at least one of the various embodiments, each final schedule entry may be associated with a specific time range and team member that enable the responsible team member to be determined.

In some cases, the portion of the final schedule that has already elapsed may be archived. The archived portions of the final schedule may be preserved for review or auditing.

In at least one of the various embodiments, team members may be associated with a schedule layer. Some schedule layers may be configured to rotate which member of the team is on-call. In at least one of the various embodiments, the duration of each shift may be a property of the schedule layer. For example, in at least one of the various embodiments, a schedule layer may have a shift duration of 24 hours (daily rotation). Thus, in at least one of the various embodiments, a schedule layer that has seven members and 24 hour shift duration may generate schedule entries such that each team member will be on-call one day out seven.

In at least one of the various embodiments, layers may be associated with restrictions that may be used to determine time periods when the schedule layer is active and/or inactive. Also, in at least one of the various embodiments, an override schedule layer may be created and applied to a schedule.

In at least one of the various embodiments, override layers take precedence over other schedule layers in the schedule. Accordingly, override schedule layers may have a highest precedent value if compared to other schedule layers in the schedule.

In at least one of the various embodiments, the formulas used to generate schedules from layers may be arranged accommodate variations in time calculations caused by time zone changes, day light savings, leap years, or the like.

An alternative schedule generation embodiment may employ a technique that does not employ layers. In at least one of the various embodiments, a user may provide a set of schedule entries (with arbitrary team members and durations), and then the scheduling application may generate a schedule by repeating that pattern indefinitely. For example (starting Monday at 9 am): [A, 12 h], [B, 12 h], [A, 48 h], [C, 48 h], [D, 24 h], [E, 24 h] may define the schedule entries for a pattern having an epoch of 1 week. The schedule application may be arranged to repeat this pattern of schedule entries indefinitely for every week to generate a schedule.

Illustrative Operation Environment

FIG. 1 shows components of one embodiment of an environment in which the invention may be practiced. Not all the components may be required to practice various embodiments, and variations in the arrangement and type of the components may be made. As shown, system 100 of FIG. 1 includes local area networks ("LANs")/wide area networks ("WANs")-(network) 111, wireless network 110, client devices 101-104, application server 112, monitoring server 114, and schedule manager server 116.

Generally, client devices 102-104 may include virtually any portable computing device capable of receiving and sending a message over a network, such as network 111, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client devices 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client device 101 may include virtually any computing device capable of communicating over a network to send and receive information, including messaging, performing various online actions, or the like. The set of such devices may include devices that typically connect using a wired or wireless communications medium such as personal computers, multiprocessor systems, microprocessor-based or programmable consumer electronics, network Personal Computers (PCs), or the like. In one embodiment, at least some of client devices 102-104 may operate over wired and/or wireless network. Today, many of these devices include a capability to access and/or otherwise communicate over a network such as network 111 and/or even wireless network 110. Moreover, client devices 102-104 may access various computing applications, including a browser, or other web-based application.

In one embodiment, one or more of client devices 101-104 may be configured to operate within a business or other entity to perform a variety of services for the business or other entity. For example, client devices 101-104 may be configured to operate as a web server, an accounting server, a production server, an inventory server, or the like. However, client devices 101-104 are not constrained to these services and may also be employed, for example, as an end-user computing node, in other embodiments. Further, it should be recognized that more or less client devices may be included within a system such as described herein, and embodiments are therefore not constrained by the number or type of client devices employed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In one embodiment, a user of the client device may employ the browser application to perform various actions over a network.

Client devices 101-104 also may include at least one other client application that is configured to receive and/or send data, including budgeting and forecasting information, between another computing device. The client application may include a capability to provide requests and/or receive data relating to managing, operating, or configuring the schedule manager server 114. In some embodiments, the client application may employ processes such as described below in conjunction with FIGS. 9-15 to perform at least some of its actions.

Wireless network 110 is configured to couple client devices 102-104 and its components with network 111. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like. In essence, wireless network 110 may include virtually any wireless communication mechanism by which information may travel between client devices 102-104 and another computing device, network, or the like.

Network 111 is configured to couple network devices with other computing devices, including, schedule manager server 116, monitoring server 114, application server 112, client device(s) 101, and through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, computer-readable devices described in more detail below.

Figure 2:
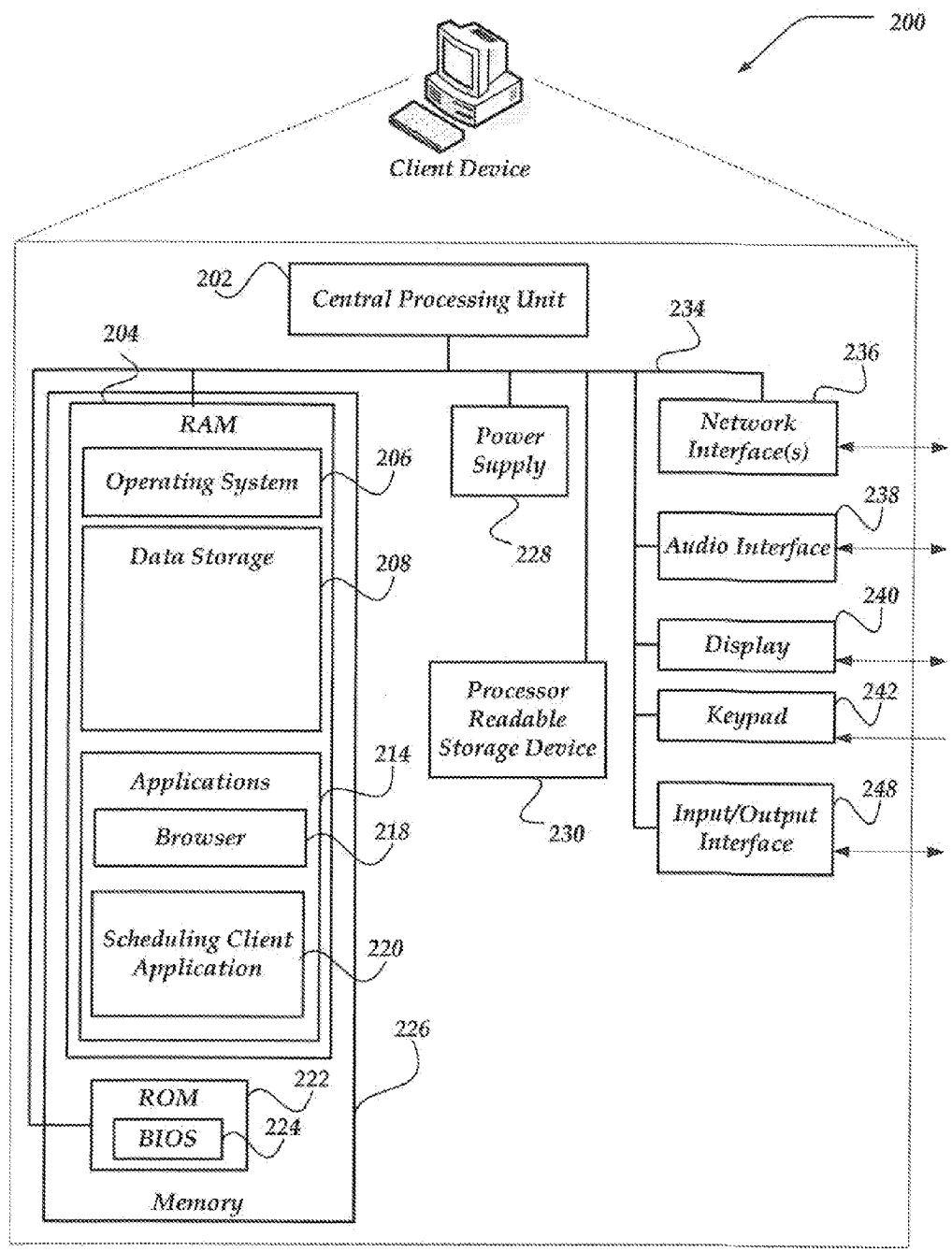
FIG. 2 shows a client device in which at least one of the various embodiments may be practiced.

Schedule manager server 116 may include virtually any network device usable to provide schedule management services, such as network device 200 of FIG. 2. In one embodiment, schedule manager server 116 employs various techniques for generation of resource schedules and notification policies. Schedule manager server 116 may be operative to perform notifications based on one or more notification rules and/or policies. Also, schedule manager server 116 may be arranged to interface/integrate with one or more external systems such as telephony carriers, email systems, web services, or the like, to send notifications relating to scheduling and/or incidents. In some cases, incidents may be generated based on communication from one or more monitoring systems, such as monitoring server 114.

Devices that may operate as schedule manager server 116 include various network devices, including, but not limited to personal computers, desktop computers, multiprocessor systems, microprocessor-based or programmable consumer electronics, network PCs, server devices, network appliances, or the like. It should be noted that while schedule manager server 116 is illustrated as a single network device, the invention is not so limited. Thus, schedule manager server 116 may represent a plurality of network devices. For example, in one embodiment, schedule manager server 116 may be distributed over a plurality of network devices and/or implemented using cloud architecture.

Moreover, schedule manager server 116 is not limited to a particular configuration. Thus, schedule manager server 116 may operate using a master/slave approach over a plurality of network devices, within a cluster, a peer-to-peer architecture, and/or any of a variety of other architectures. Thus, schedule manager server 116 is not to be construed as being limited to a single environment, and other configurations, and architectures are also contemplated. Schedule manager server 116 may employ processes such as described below in conjunction with at some of the figures discussed below to perform at least some of its actions.

Illustrative Client Device

FIG. 2 shows one embodiment of client device 200 that may be included in a system implementing at least one of the various embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-104 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, and an input/output interface 248. Power supply 228 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, global system for mobile communication ("GSM"), code division multiple access ("CDMA"), time division multiple access ("TDMA"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action. Display 240 may be a liquid crystal display ("LCD"), gas plasma, light emitting diode ("LED"), or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. At least a portion of the information may also be stored on a disk drive or other processor-readable storage device 230 within client device 200.

Applications 214 may include computer executable instructions which, when executed by client device 200, transmit, receive, and/or otherwise process network data. Examples of application programs include, but are not limited to calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218 and scheduling client application 220.

Browser 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based languages may be employed. In one embodiment, browser 218 may enable a user of client device 200 to communicate with another network device, such as schedule manager server 116, monitoring server 114, and/or application server 112 in FIG. 1. In one embodiment, browser 218 may enable a user to view and/or manipulate schedules, status reports, administrative functions, or the like.

In at least one of the various embodiments, a user may employ client device 200 to interact and access information stored or otherwise managed by schedule manager server 116. In at least one of the various embodiments, scheduling client application 220 may be arranged to enable a user to view and/or manipulate schedule management features, status reports, administrative functions, or the like, as further discussed below.

In any event, scheduling client application 220 may employ processes similar to those described below in conjunction with the figures discussed below to perform at least some of its actions.

Illustrative Network Device

Figure 3:
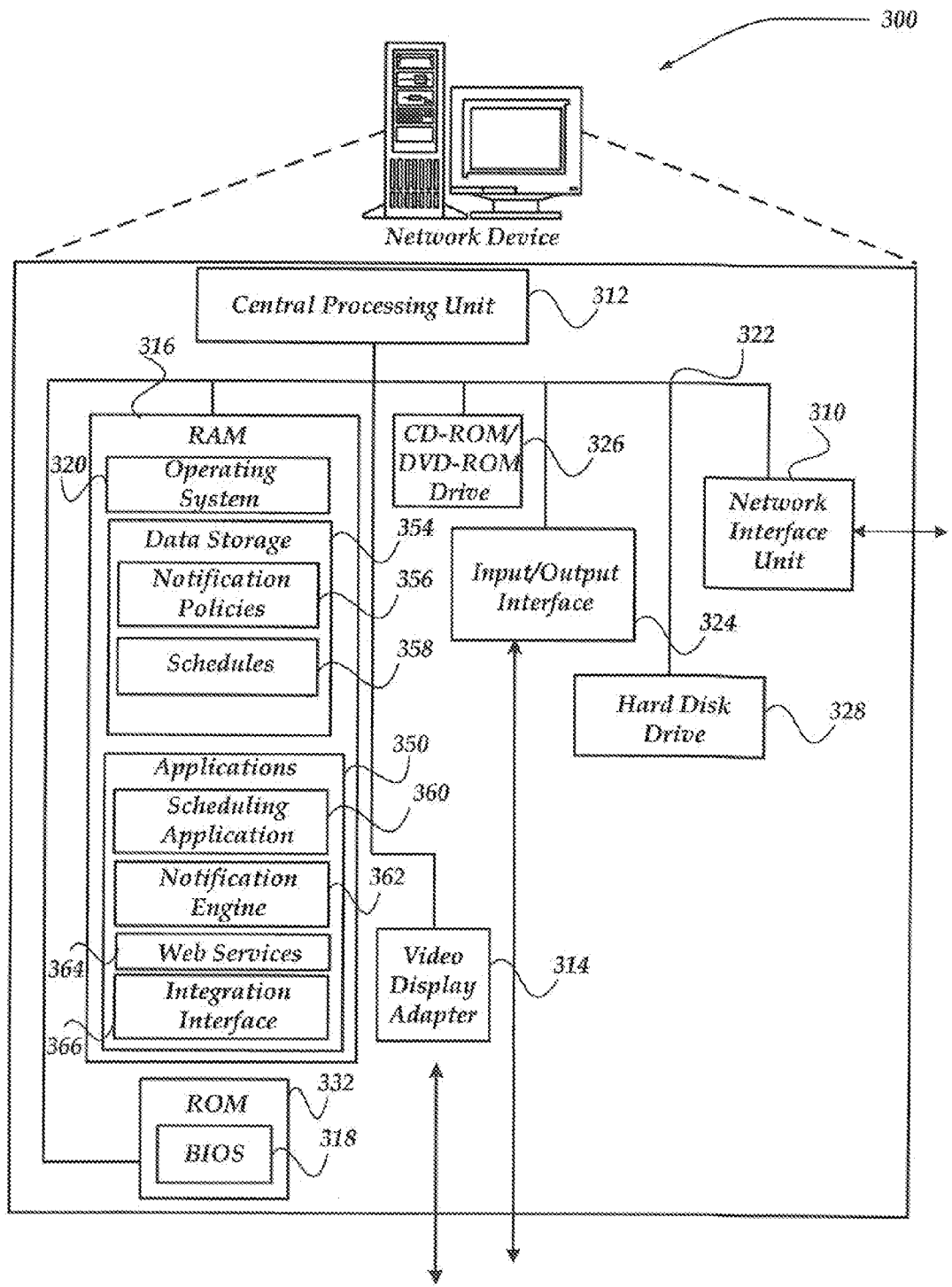
FIG. 3 shows a network device in which at least one of the various embodiments may be practiced.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, schedule manager server 116 of FIG. 1.

Network device 300 includes central processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, flash drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC). Network device 300 also includes input/output interface 324 for communicating with external devices, such as a headset, or other input or output devices not shown in FIG. 3. Input/output interface 324 can utilize one or more communication technologies, such as USB, infrared, Bluetooth™, or the like.

The mass memory as described above illustrates another type of computer-readable media, namely computer-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electronically Erasable Programmable Read-Only Memory (EEPROM), flash memory or other memory technology, Compact Disc Read-Only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data storage 354 may include a database, text, spreadsheet, folder, file, or the like Data storage 354 may further include program code, data, algorithms, or the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Mass memory may also include scheduling application 360, notification engine 362, web services 364, and integration interface 366.

Web services 364 represent any of a variety of services that are configured to provide content or communications, over a network to another computing device. Thus, web services 364 may include for example, a web server, a File Transfer Protocol (FTP) server, a database server, a content server, or the like. Web services 364 may provide the content over the network using any of a variety of formats, including, but not limited to WAP, HDML, WML, SGML, HTML, XML, compact HTML (cHTML), extensible (xHTML), or the like.

In one embodiment, web services 364 may provide an interface for accessing and manipulating data in a data store, such as data storage 354, or the like. In another embodiment, web services 364 may provide interfaces for interacting with scheduling application 360 and/or notification engine 362 that may enable a user to access and/or otherwise manage schedule manager and notification services that may be provided through network device 300. For example, in at least one of the various embodiments, a user may access and/or otherwise manage scheduling management services through web services 364 using client devices 101-104.

In at least one of the various embodiments, notification engine 362 may be enabled to manage and/or generate notification policies that may be associated with various resources and/or team members. In at least one of the various embodiments, notification engine 362 may be a component of scheduling application 360 or, it may be deployed as a process, plug-in, extension, kernel module, or the like.

In at least one of the various embodiments, integration interface 366 may be enabled to manage and/or facilitate integrating components, such as, scheduling application 360, notification engine 362, and web service 364 with external and/or third party applications and systems. In at least one of the various embodiments, integration engine 366 may be a component of other applications, such as, scheduling application 360, notification engine 362, web services 364, or the like, or, it may be deployed as a process, plug-in, extension, kernel module, or the like.

In any event, in at least one of the various embodiments, scheduling application 360, notification engine 362, web services 364, or integration interface 366 may employ processes, or parts of processes, similar to those described in conjunction with the figures below to perform at least some actions.

Illustrative Logical Scheduling Architecture

FIGS. 4-8 are presented to illustrate various scheduling and embodiments that may be enabled. FIG. 4 shows a logical schematic of schedule 400 in accordance with at least one of the various embodiments. It includes four seven day weeks (Sunday through Saturday) 404. In this example, the scheduled resource is to four member team 402. Team 402 has four members, Adam, Bruce, Chris, and Doris. If depicted in the schedule, team members are referred to using the first letter of their name (A for Adam, B for Bruce, C for Chris, and D for Doris) for the purposes of brevity.

Schedule 400 depicts a schedule where team members are assigned shifts to be responsible to providing some service, such as, telephonic customer support, or the like. The particular type of service or team member responsibility is unrelated these innovations, and should not be considered limiting. Starting with Adam, team members in this non-limiting example have shifts for an entire day before responsibility transfers to another team member. In at least one of the various embodiments, responsibility may rotate among team members based on the order they appear in team list 402. Thus, in this example, Bruce is scheduled after Adam, Chris after Bruce, and so on.

In at least one of the various embodiments, schedules may have a determinable period where the allocation of resources (e.g., team members) included in the schedule may repeat. In at least one of the various embodiments, this determinable time period may be referred as an epoch.

In at least one of the various embodiments, properties of a schedule used to determine an epoch may include rotation length/shift duration (e.g., daily, weekly, monthly, any arbitrary number of hours or days, or the like), the number of resources or team members being scheduled, the number of teams, restrictions, or the like. For example, in at least one of the various embodiments, every four day (96 hours) the team member rotation for example schedule 400 will repeat such that Adam will be scheduled to be active. In at least one of the various embodiments, thus schedule 400 may have an epoch of 4 days (or 96 hours), since that is how long it may take for the rotation to loop back to the first team member on the Team 1 list in such a way that the rotation starts again from the beginning, assuming there are no other restrictions that would further extend the epoch In at least one of the various embodiments, In at least one of the various embodiments, if a schedule includes restrictions or other anomalies, the computation of the epoch may be adjusted to take them into account.

In at least one of the various embodiments, changing the properties of a schedule may cause the epoch to change. For example, reducing the number of team members in the schedule may reduce the schedule's epoch. Accordingly, if team 402 was reduced to two members, the epoch for schedule 400 would change from four weeks to two weeks. Meaning that on the beginning of the third week the rotation cycle begins to repeat.

Figure 5:
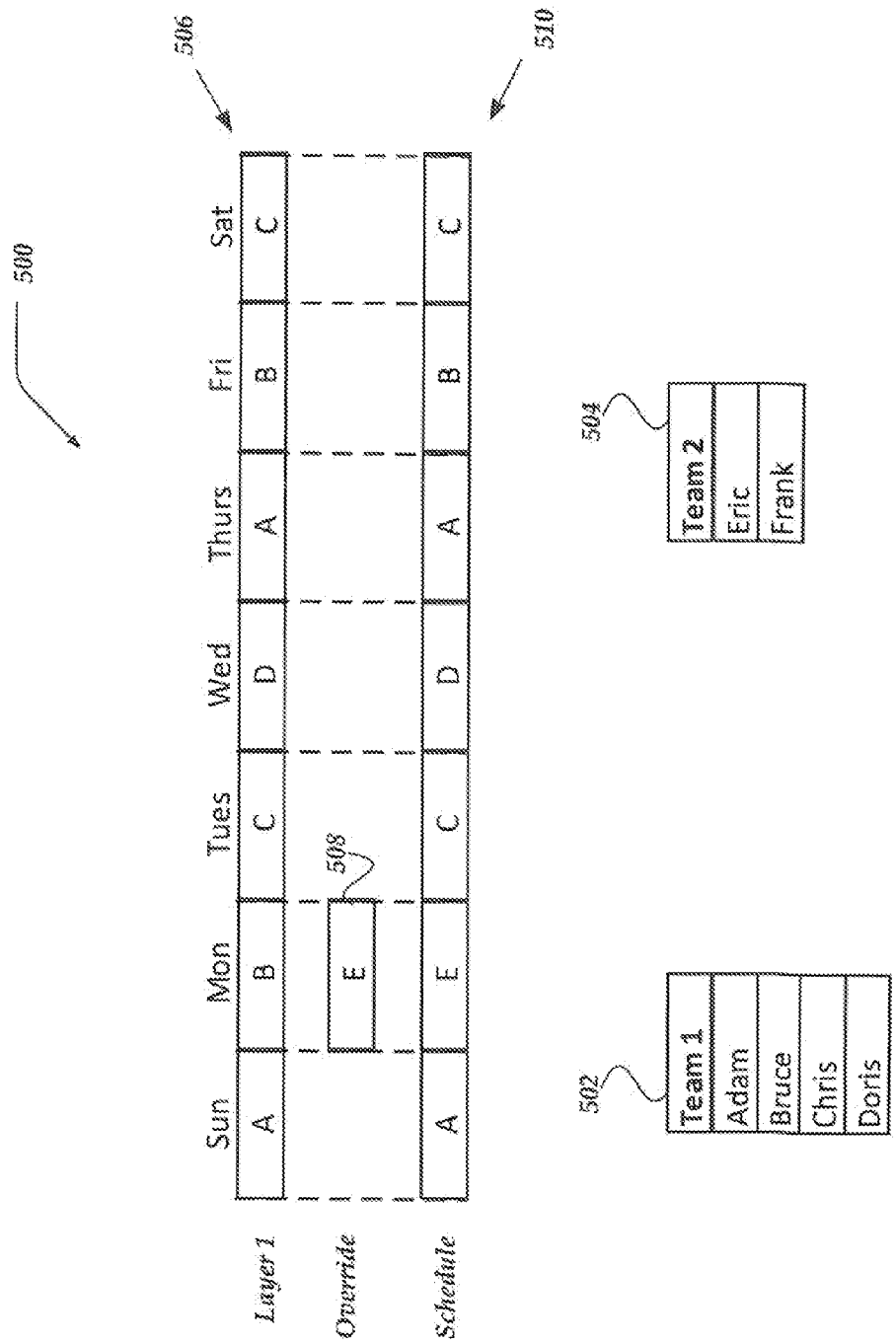
FIG. 5 shows a logical schematic of a schedule that includes an override generated in accordance with at least one of the various embodiments.

FIG. 5 shows a logical schematic of schedule 500 that includes an override schedule layer generated in accordance with at least one of the various embodiments. In at least one of the various embodiments, to accommodate ad-hoc, one-time, or temporary changes made to a schedule, scheduling application 360 may generate a final schedule by combining an override layer with one or more standard schedule layers. In at least one of the various embodiments, overrides may be used to represent Schedule 500 includes two teams, team 502 ("Team 1") and team 504 ("Team 2"). Further, in this example, schedule 500 is comprised of two schedule layers, schedule layer 506 ("Layer 1") and override schedule layer 508 ("Override").

In at least one of the various embodiments, scheduling application 360 may generate final schedule 510 by merging schedule layer 506 and override schedule layer 508. In this example, layer 508 may be associated with a single team member from team 504 and only applies to part of the epoch ("Monday").

In at least one of the various embodiments, teams may not be associated with an override layer. In at least one of the various embodiments, this may be because the "team" concept may be used for generating a pattern of recurring schedule entries on a normal schedule layer. In contrast, in at least one of the various embodiments, override layers may be used contain once off changes to a schedule. Thus, in at least one of the various embodiments, override entries may be specified by having the user input the schedule entry (i.e. the start and end times, and the person who should be on call). For at least that reason, in at least one of the various embodiments, teams, shift durations, start time, or restrictions, may be absent from override layers.

In at least one of the various embodiments, schedule layers may be merged based on a express or implied precedent value for the schedule layer. In at least one of the various embodiments, override schedule layers may be assumed to always have a higher precedence value than any normal schedule layer (e.g. non-override layers). Thus, in this example, override schedule layer 508 has precedence over schedule layer

506. Accordingly, schedule application 360 may generate final schedule 510 that includes Eric as the active/on-call member for Monday.

In at least one of the various embodiments, also an override does not have to exactly overlap with the schedule entry that appears on a lower layer. For example, in FIG. 5, it would be acceptable for Eric's on call period to run from Sunday at 13:00 to Monday at 13:00. Additionally, in at least one of the various embodiments, an override may be an arbitrary amount of time long (i.e. it does not have to be the same length as an on call shift).

In at least one of the various embodiments, each schedule layer precedent value may be assigned expressly, or the precedent value may be determined based on the order the schedule layer is located in the schedule, or the like, or combination thereof. In any event, the schedule application may determine precedent value for each schedule layer.

Figure 6:
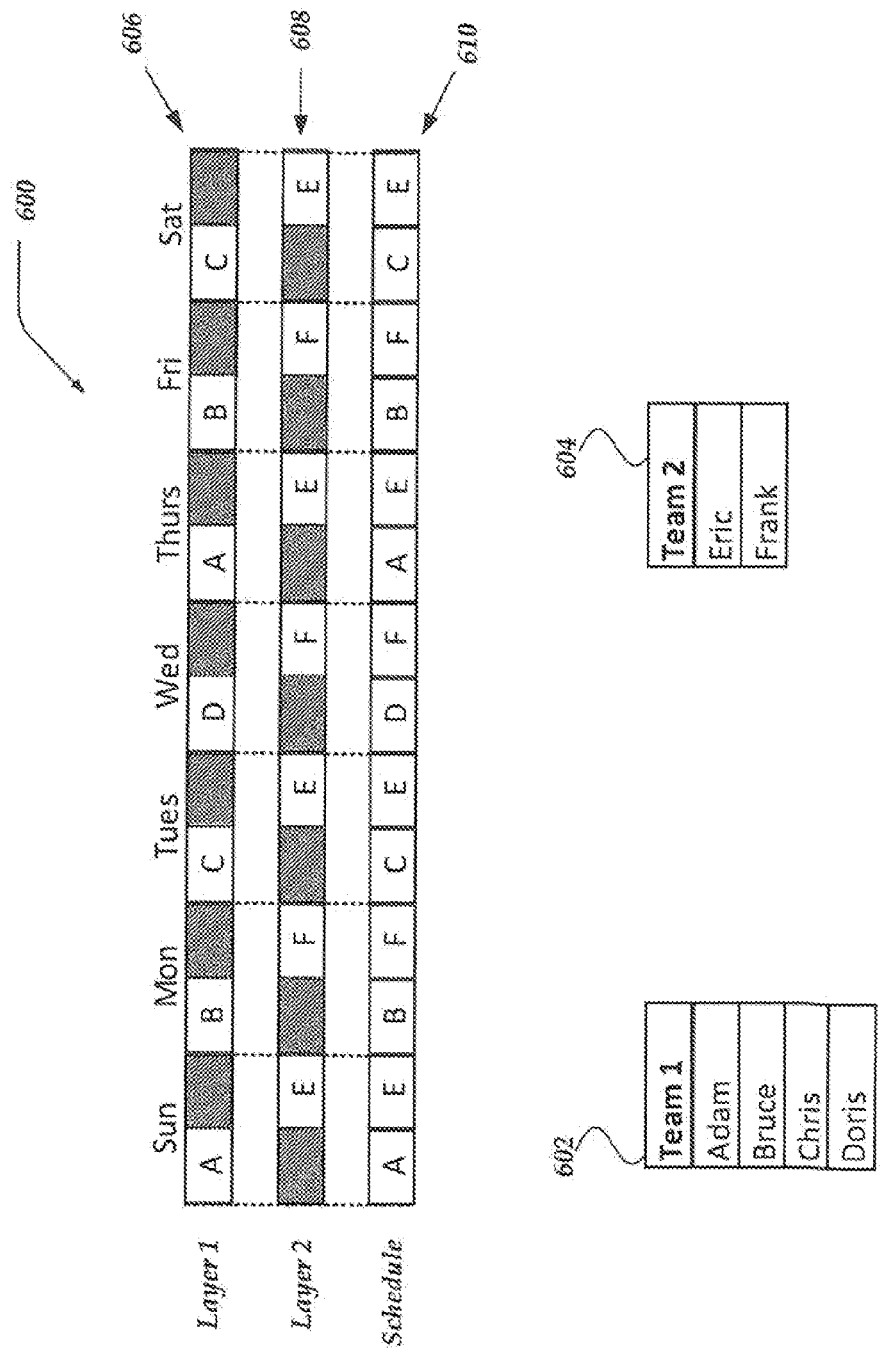
FIG. 6 shows a logical schematic of a schedule generated from two layers in accordance with at least one of the various embodiments.

FIG. 6 shows a logical schematic of schedule 600 generated from two schedule layers in accordance with at least one of the various embodiments. This example shows how, for at least one of the various embodiments, scheduling application 360 may generate a final schedule 610 by combining multiples layers (layer 606 and layer 608) where each schedule layer includes a restriction.

In this example, schedule layer 606 includes team 602 ("Team 1") and schedule layer 608 includes team 604 ("Team 2"). A restriction included in schedule layer 606 ("Layer 1") prevents members from team 602 from being scheduled during the last part of each day (e.g., 8 pm-8 am). Likewise, schedule layer 608, includes a restriction that excludes members from team 604 from being scheduled during the hours of 8 am to 8 pm. Accordingly, scheduling application 360 incorporates the restrictions in each schedule layer to produce final schedule 610.

In at least one of the various embodiments, having separate schedule layers for each team enables the scheduling application to rotate the teams independent of each other. For example, for at least one of the various embodiments, team 602 may be a four person rotation (e.g., each team member is "on-call" every fourth day) and team 604 may be a two person rotation (e.g., each team member is "on-call" every other day).

In at least one of the various embodiments, there may be various ways to arrange schedule layers and/or restrictions to produce an outcome equivalent to final schedule 610. The innovations are not limited to example depicted in FIG. 6.

In at least one of the various embodiments, final schedule 610 may be generated without using a restriction on Layer 1. For example, the following arrangement may be used:

Layer 1: Daily rotation, no restriction, Start time at Sunday @ midnight
Layer 2: Daily rotation, 00-12 h daily restriction, Start time at Sunday @ midnight Thus, in at least one of the various embodiments, in this case, a restriction on schedule Layer 1 may be unnecessary, because the higher precedence of Layer 2 may cause person E to go on call regardless of whether A is on call for Sun 12-23:59 or whether there is a restriction there.

In at least one of the various embodiments, each schedule layer may have a team member on call at a time at the layer level. But layer precedence rules may enable the active/on-call team member(s) from higher precedent schedule layers to be added to the final schedule even if there is more than one layer with someone active at a particular time.

In at least one of the various embodiments, there may be multiple ways to generate the same final schedule. For example, the final schedule 610 in FIG. 6 may be built by using at least one of these methods:

Method A
Layer 1: Daily rotation, 00-12 h restriction, start time Sunday @ midnight
Layer 2: Daily rotation, 12-00 h restriction, start time Sunday @ midnight
(This is what is shown in FIG. 6)

Method B
Layer 1: Daily rotation, no restriction, Start time at Sunday @ midnight
Layer 2: Daily rotation, 00-12 h daily restriction, Start time at Sunday @ midnight
(These rules would produce a different Layer 1 compared to FIG. 6, but the final schedule would be the same.)

Method C
Layer 1: 12 h rotation, 00-12 h restriction, start time Sunday @ midnight
Layer 2: 12 h rotation, 12-24 h restriction, start time Sunday @ midnight
(These rules would also produce both layers and a finale schedule such as the one illustrated in FIG. 6.)

In at least one of the various embodiments, many other rule configurations would work as well. In non-limiting examples, the rules may (or may not) produce schedule layers different from what is shown in FIG. 6, but they may compose into the same final schedule, such as final schedule 610.

In at least one of the various embodiments, different schedule layers may have different shift durations. For example, in at least one of the various embodiments, Layer 2 may be configured to use a 2-day shift duration, while Layer 1 may be configured to use a 1-day shift duration. In that case, in at least one of the various embodiments, the combined schedule may be A, E, B, E, C, F, D, F, and so on.

In at least one of the various embodiments, different schedule layers may have different on-call handoff times or start times. Also, in at least one of the various embodiments, different schedule layers may also have team member lists that are disjoint in the resources (team members) they contain. They may contain the same resources (in the same order or not), or the resources (team members) may partially overlapped. In other words, in at least one of the various embodiments, team member lists of different schedule layers may be independent.

Figure 7:
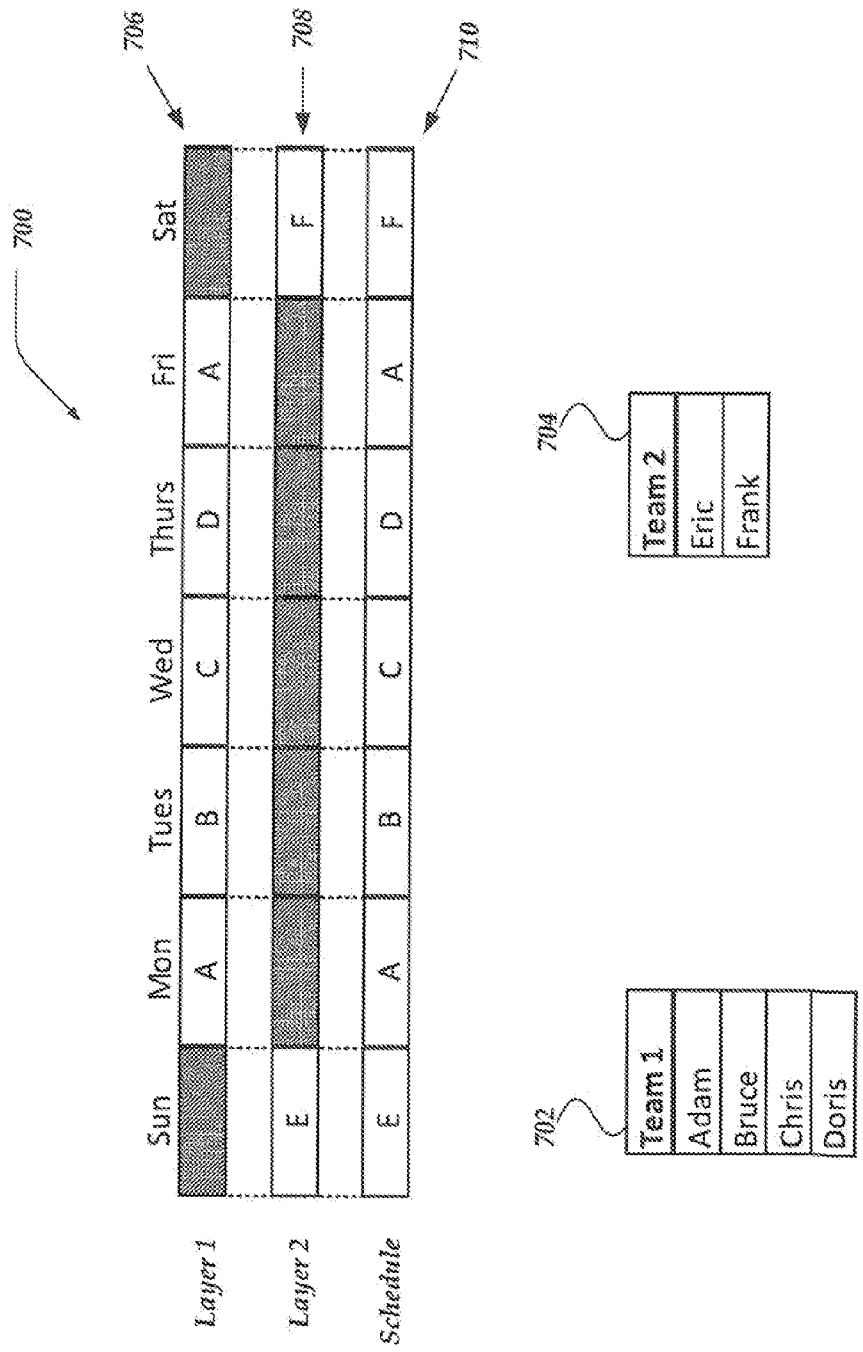
FIG. 7 shows another logical schematic of a schedule generated from two layers in accordance with at least one of the various embodiments.

FIG. 7 shows a logical schematic of schedule 700 generated from two schedule layers in accordance with at least one of the various embodiments. Schedule 700 is an example of a schedule comprising two teams where one team (team 702) is "on-call" during the weekdays (Monday through Friday) and another team (team 704) is "on-call" during the weekends. In this example, team 702 is scheduled for daily shifts using schedule layer 706. Further, since in this example, team 702 is excluded from weekend duty, schedule layer 706 includes a restriction excluding team 702 members from being scheduled on the weekends. Likewise, schedule layer 708 is used to schedule team 704. Accordingly, schedule layer 708 includes a restriction that excludes team 704 members from being scheduled during a weekday. Thus, for this example, scheduling application 360 may generate final schedule 710.

Figure 8:
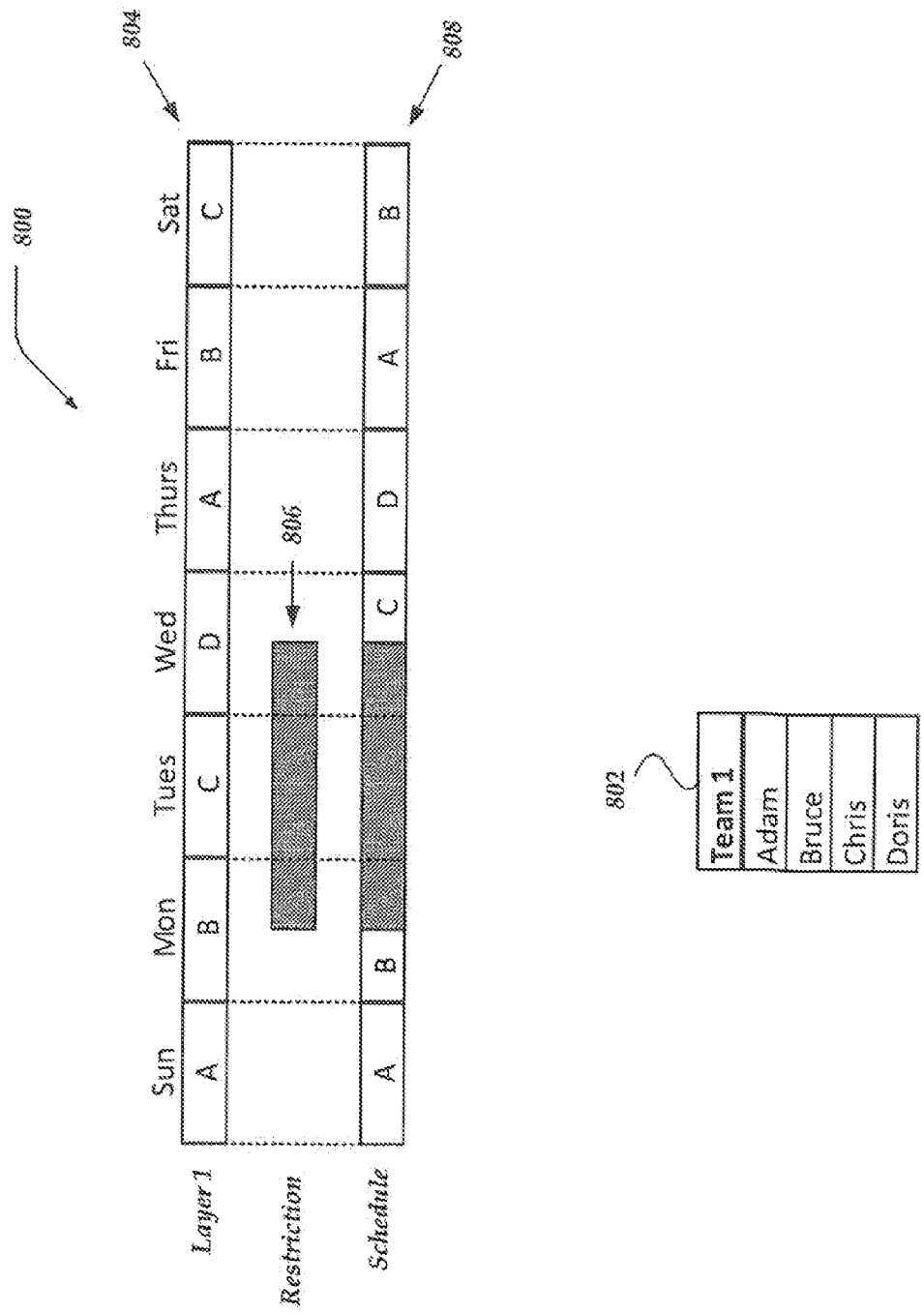
FIG. 8 shows a logical schematic of a schedule layer that includes a restriction generated in accordance with at least one of the various embodiments.

FIG. 8 shows a logical schematic of schedule 800 that includes a detail view of restriction generated in accordance with at least one of the various embodiments. Schedule 800 includes schedule layer 804 that is used in this example to illustrate the scheduling of team 802 using a daily shift duration. As discussed above, restrictions may be added and/or associated with a schedule layer to define portions of the schedule layer that team members and/or resource are to be excluded from a schedule.

For example, restriction 806 may indicate that team members from team 802 are to be excluded being scheduled during the second half of Monday through the first half of Wednesday. The purpose of the restriction is irrelevant to this discussion, but one could contemplate such a restriction may represent a regularly scheduled system downtime where it is not necessary for any team members from team 802 to be on-call.

However, in at least one of the various embodiments, if, for example, Charlie was associated with on both this schedule layer and another schedule layer (e.g., a team member of both layers), it may be possible for Charlie to be on call in the final schedule even though the restriction in effect for this schedule layer prevents him from being on call on account of this schedule layer.

In at least one of the various embodiments, scheduling application 360 may generate schedule layer 808 based on schedule layer 804 (pre-restriction layer), and restriction 808. Schedule layer 808 may be generated such that restriction 806 does not cause team member Chris to be skipped over. In at least one of the various embodiments, scheduling application 360 may be arranged to avoid skipping over a resource or team member. In at least one of the various embodiments, the scheduling application may accomplish this by keeping track of if a team member has been assigned to a schedule entry covering some portion of an on-call shift before moving to the next team member. Thus, schedule layer 808 has Chris on-call on the Wednesday shift rather than staying assigned to the Tuesday shift. Otherwise, Chris would be skipped in the rotation because Tuesday is included in restriction 806.

In at least one of the various embodiments, restriction 806 may be thought of as being part of schedule layer 804, such as that schedule layer 804 may incorporate effect of the restriction directly into the schedule layer. In other words, in at least one of the various embodiments, restriction 806 may be part of schedule layer 804 not separate from it. Thus, in at least one of the various embodiments, the depiction of schedule 808 may be thought of representing the way schedule layer 804 may look after it has incorporated restriction 806. In at least one of the various embodiments, restrictions (along with the ordered list of team members to rotate over, the shift duration, the on-call handoff point, and the start time of the layer) may all be properties of a schedule layer.

Generalized Operations

FIGS. 9-15 use flow charts to illustrate the general operations that may be performed by at least one of the various embodiments, including by scheduling application 360. In at least one of the various embodiments, processes 900, 1000, 1100, 1200, 1300, 1400, and 1500 described in conjunction with FIGS. 9-15 may be implemented by and/or executed on a single network device, such as network device 300 of FIG. 3. In other embodiments, these processes or portions of process thereof may be implemented by and/or executed on a plurality of network devices, such as network device 300 of FIG. 3. However, embodiments are not so limited and various combinations of network devices, blade servers, or the like may be utilized. Further, in at least one of the various embodiments, the processes described in conjunction with FIGS. 9-15 may be operative in schedule management architectures such as those described in conjunction with FIGS. 4-8. In at least one of the various embodiments, scheduling application 360 may be enable to perform one or more of the actions described in conjunction with FIGS. 9-15.

Figure 9:
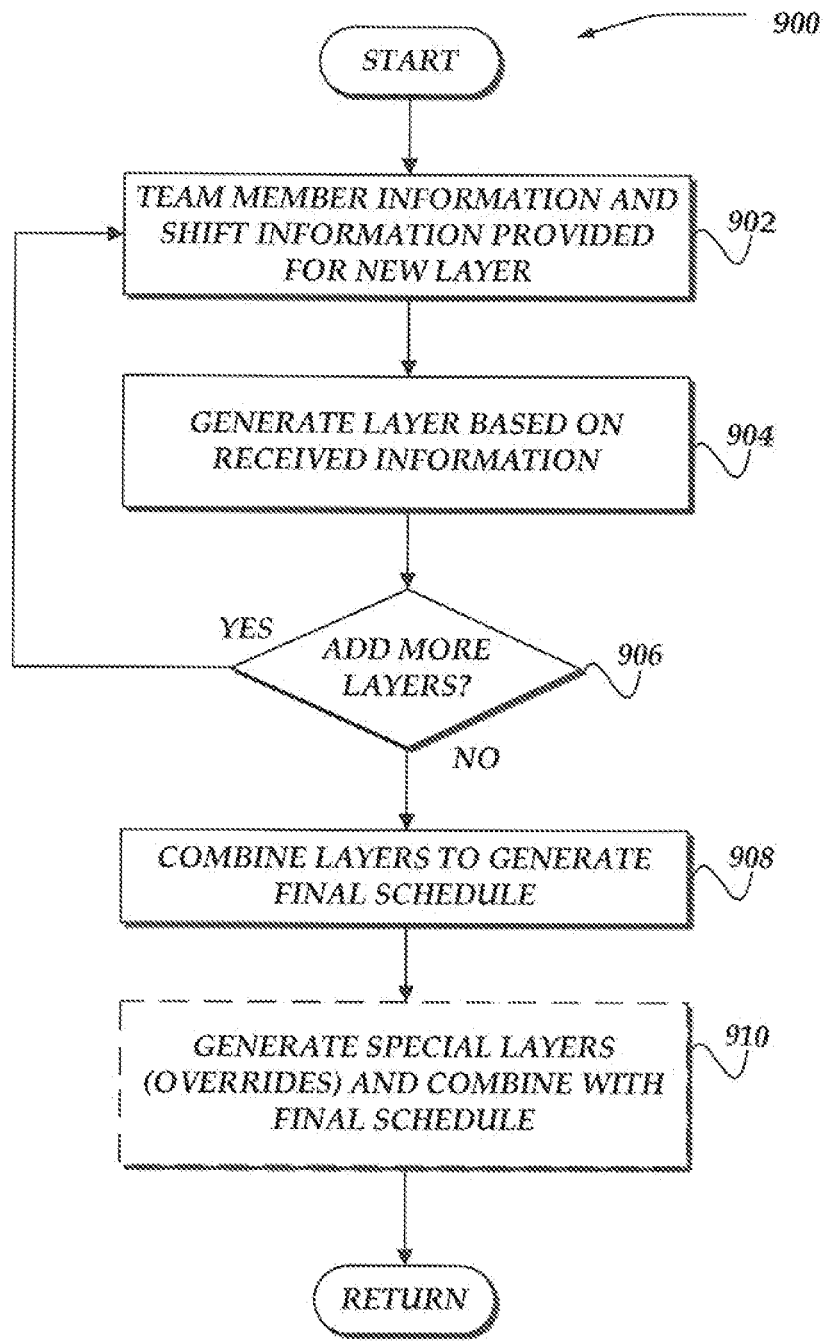
FIG. 9 illustrates an overview flowchart for a process for generating a resource schedule in accordance with at least one of the various embodiments.

FIG. 9 shows an overview flowchart for process 900 for generating schedules in accordance with at least one of the various embodiments. In at least one of the various embodiments, process 900 may be employed to generate and/or create new schedules.

After a start block, at block 902, team member information and rotation information may be provided for a new schedule layer. In at least one of the various embodiments, team member information may include information that is sufficient to identify each schedulable team member to be associated with the new schedule layer and the order in which their on-call shifts should proceed. In at least one of the various embodiments, team members may occur more than once in the ordered rotation list.

In at least one of the various embodiments, information necessary for generating schedules may be provided using various methods, including, user-interfaces, machine interfaces, web services, or the like.

In at least one of the various embodiments, an ordered list of team members (the rotation list), a shift duration, precedent value, and a start time may be employed to generate a schedule layer. Also, in at least one of the various embodiments, a time for the first one call handoff time may be provided. For example, a first on-call handoff time may enable the user to specify that they want a 24 hour shift duration where shifts end at 9 a.m. instead of at Midnight. For comparison, in at least one of the various embodiments, the start time may be the point in time at which the system begins building new schedule entries according to the process 1100 in FIG. 11. In at least one of the various embodiments, a first on-call handoff time may enable a user to edit a schedule effective at certain date/time while leaving the on-call handoff time unchanged.

At block 904, in at least one of the various embodiments, a scheduling application, such as, scheduling application 360 may generate the new schedule layer based in part on the information provided in block 902.

In at least one of the various embodiments, schedule layers represent the rules and policies that may be employed by the scheduling application to generate schedule entries. In at least one of the various embodiments, the provided schedule layer parameters along with the associated restrictions and team members may be employ to produce the schedule entries that correspond to each schedule layer.

At decision block 906, in at least one of the various embodiments, if additional schedule layers are still required control may loop back to block 902 to get the information for generating the next new schedule layer. Otherwise, control may continue to the block 908.

At block 908, in at least one of the various embodiments, a final schedule based on comparing the schedule entries generated from the schedule layers to generate one or more final schedule entries. The final schedule may be generated using the one or more final schedule entries generated from the schedule entries from the combined/collapsed schedule layers.

In at least one of the various embodiments, as discussed above, override schedule layers may be optional schedule layers that are configured to have precedent over the other schedule layers in the schedule.

At block 910, in at least one of the various embodiments, optionally users may make additional modifications to the schedule that may include special schedule layers, such as, an override schedule layer. In at least one of the various embodiments, the scheduling application may generate override layers based on information that may be provided by users that may be administering the schedule. In at least one of the various embodiments, the special schedule layers (if any) may be combined with the previously generated finale schedule. Next, control may be returned to a calling process.

Figure 10:
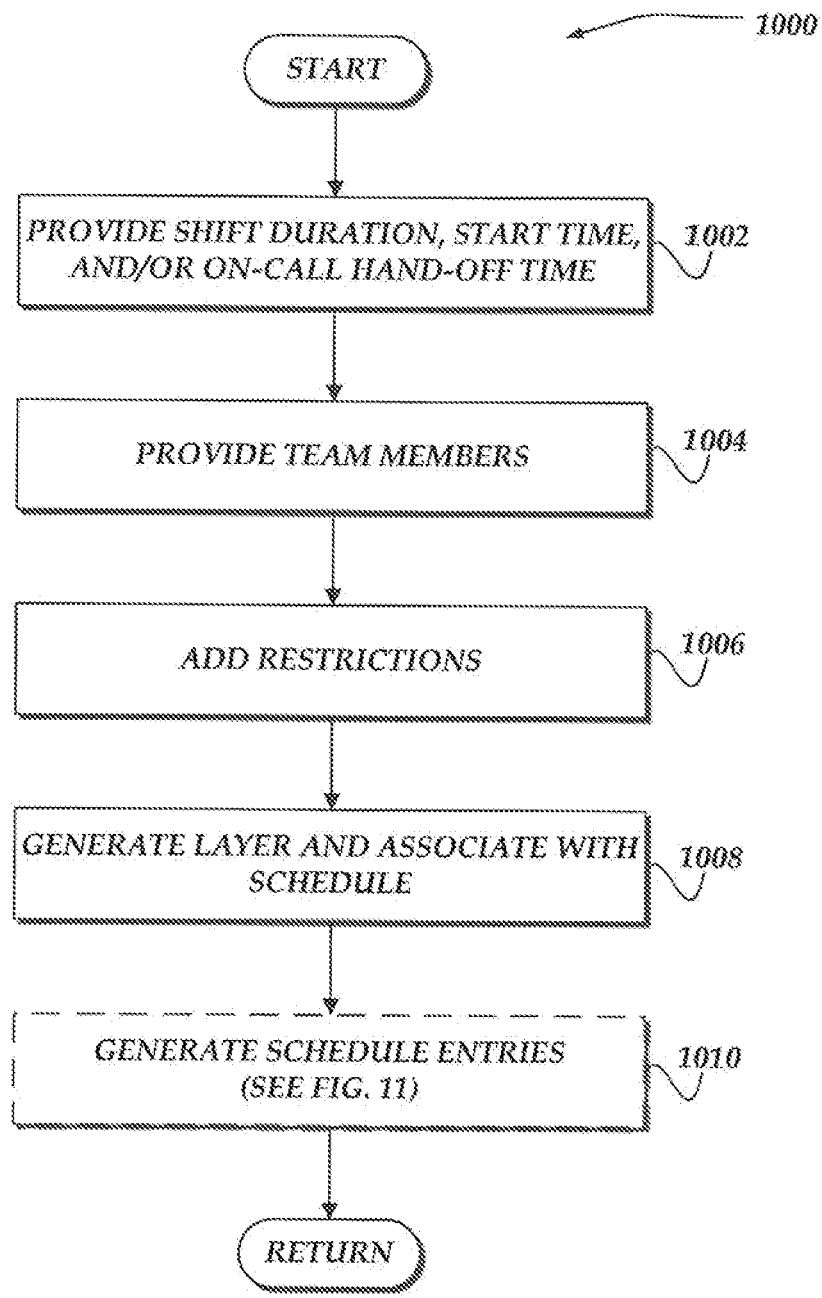
FIG. 10 illustrates a flowchart for a process for generating a schedule layer in accordance with at least one of the various embodiments.

FIG. 10 shows a flowchart for process 1000 for generating schedule layers in accordance with at least one of the various embodiments. In at least one of the various embodiments, schedule layers comprise the parameters and rules for generating schedule entries that may be combined in a final schedule. After a start block, at block 1002, the shift duration, start time, and/or a on-call handoff time, as well as, other information necessary for creating a rotation may be provided for a schedule layer.

In at least one of the various embodiments, the provided rotation information may include definitions of the rotation cycle shift duration that may be assigned to the new schedule layer (e.g., Hourly, Daily, Monthly, an arbitrary number of hours, an arbitrary number of days, or the like).

In at least one of the various embodiments, the provided information may also include a start time for this schedule layer, which may be a point in time where the scheduling application may begin generating new schedule entries for this layer. If creating a new schedule, this start time may be often "now", but it is not so limited. If editing an existing schedule layer, the start time may be the point in time where the new rotation parameters may take effect.

In at least one of the various embodiments, the start time may be set into the future. For example, in at least one of the various embodiments, if an employee has given their two week notice, a user may want to remove the employee from each layer's rotation pattern (and thus the schedule) effective two weeks into the future, while leaving them in the rotation pattern until then.

Also, in at least one of the various embodiments, the provided information may include a time for the first on call handoff. As discussed above, this may be used to "align" the on-call shifts with calendar time.

In at least one of the various embodiments, shift duration represents the building block time period for the schedule layer. Absent intervening restrictions, a team member may be active (on-call) for a length time determined by the shift duration. For example, if a shift duration is two days, then every two days the current active team member rotate to another team member associated with the schedule layer will become active. Likewise, if the shift direction is four hours, the active team member may rotate every four hours. In at least one of the various embodiments, in some configurations the next team member may be determined to be the current team member. Even though the actual team member may not rotate, the determination of who the active team member should be may be made for each shift.

At block 1004, an ordered list of one or more team members may be provided. The list may contain the same person/resource more than once.

In at least one of the various embodiments, team members may represent persons and/or that may be assigned to a schedule derived from the current schedule layer. In at least one of the various embodiments, team members are not limited to persons, they may represent generally any schedulable resource and/or collection of resources, such as, meeting rooms, vehicles, computer servers/applications, or the like.

At block 1006, one or more restrictions may be provided. In at least one of the various embodiments, restriction information for the new schedule layer may also be provided to the scheduling management server. In at least one of the various embodiments, restriction information includes properties used to define rules for excluding time periods from schedule entries produced by a schedule layer. For example, if a restriction includes a time range, such as, 5 pm-8 am, schedule entries associated with the schedule layer may be excluded from being scheduled during that time of each shift.

In at least one of the various embodiments, there may be multiple restrictions rule in effect for a given schedule layer. In at least one of the various embodiments, users may be enabled to enter any number of recurring time-of-day exceptions. For example:

Daily from 6 am to 11 am AND
Daily from 12 pm to 3 pm AND
Daily from 6 pm to 11 pm (or the like)

In at least one of the various embodiments, users may also specify restrictions as a series of times-of-the-week, such as:

Saturday 12 am to Monday 12 am AND
Wednesday 12 am to Wednesday 6 am AND
Wednesday 9 pm to 11 pm, (or the like)

In at least one of the various embodiments, one or more recurrence models, including the two above may be mixed into the same restriction. In at least one of the various embodiments, restriction recurrences may be arranged to be based on the day-of-the-month (e.g., restrict 9 am to 12 pm on the 1st and the 15th every month) or the weekday-of-the-month (e.g., restrict 9 am to 12 pm on the 2nd Monday of every month).

At block 1008, the schedule layer may be generated and associated with a schedule. In at least one of the various embodiments, schedules may be comprised of one or more schedule layers. In at least one of the various embodiments, the new schedule layer may be associated to a schedule using well-known data structures that may be stored so that the associated may be persistent. Well-known storage techniques such as databases, file systems, or the like may be employed to store this association.

In at least one of the various embodiments, the schedule layer maintain its current state, including, shift duration, team members, restrictions, precedent value, or the like, using one or more data structures. In at least one of the various embodiments, schedule layers may have unique identifiers that may be associated with their parent schedule. Further, in at least one of the various embodiments, schedule layers may be given names and/or descriptions that may make it easier for user to identify the purpose of the schedule layer.

Furthermore, in at least one of the various embodiments, schedule layers may be include a precedent value that may be used to rank the precedent order of each schedule layer that is included in the schedule. In at least one of the various embodiments, the precedent value may be determined using various methods, such as, the order the schedule layer is located in the schedule, provided expressly by users, read from a configuration value, or the like, or combination thereof. Some schedule layers, such as, override schedule layers, may have built in precedent value (e.g., override schedule layers may be the highest precedent value).

At block 1010, optionally, schedule entries may be generated from the schedule layer. In at least one of the various embodiments, schedule entries may be generated as needed from the new schedule layer. Briefly, in at least one of the various embodiments, a schedule entry may be a data structure that includes at least one time range and at least one team member. Thus, to determine a responsible team member for a given time, a schedule entry that has a time range that includes the given time of interest may be used to determine the active/on-call team member.

Next, control may be returned to a calling process.

Figure 11:
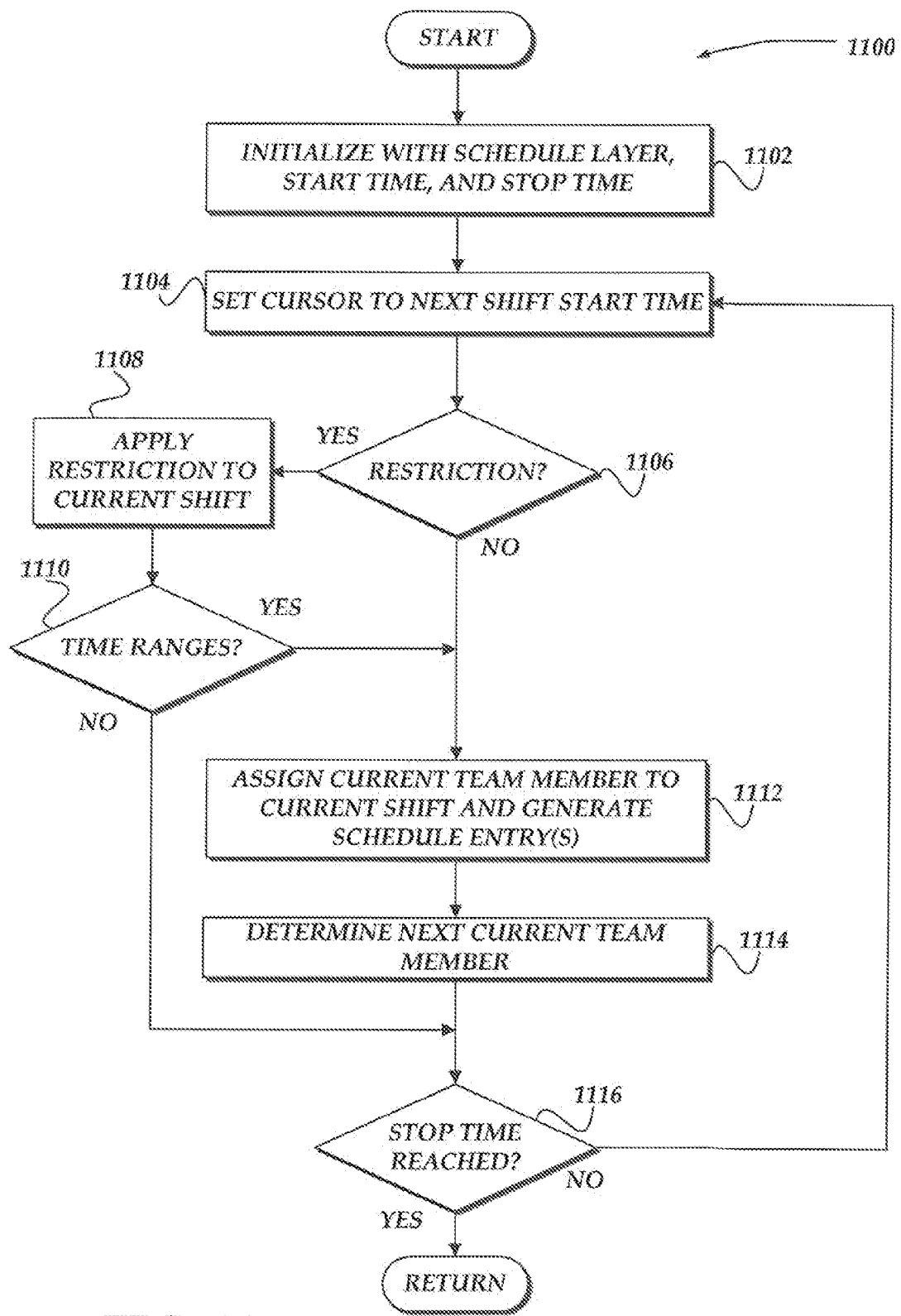
FIG. 11 shows a flowchart for a process that may be used for generating schedule entries from a schedule layer in accordance with at least one of the various embodiments.

FIG. 11 shows a flowchart for process 1100 that may be used for generating schedule entries from a schedule layer in accordance with at least one of the various embodiments.

In at least one of the various embodiments, the scheduling application may compute a schedule comprising one or more schedule entries from one or more schedule layers. In at least one of the various embodiments, each schedule entry may be associated with a time range. In at least one of the various embodiments, though not required, different schedule entries may have time ranges of different durations. Also, at least one team member may be assigned to each schedule entry.

In at least one of the various embodiments, schedule entries may be computed from schedule layers to produce schedules that extend into the future. As time passes, schedule entries that have time ranges in the past may be archived in a database.

After a start block, at block 1102 the scheduling application may be provided a schedule layer, a start time, and optionally an end time. Also, if necessary, the initial team member in the rotation may be determined. In at least one of the various embodiments, the initial team member may default to the first team member assigned to the schedule layer.

In at least one of the various embodiments, the provided start time establishes a point in time for which to start generating schedule entries. In at least one of the various embodiments, if the start time does not fall exactly on the start of a shift (e.g., on-call handoff time), a virtual start time for the schedule layer may be generated. In other words, in at least one of the various embodiments, if the start time of the schedule layer does not fall exactly on the first on call handoff time, a virtual start time may be computed to account for the difference.

In at least one of the various embodiments, a virtual start time may be computed to account for mismatch between the start time of the schedule layer and the first on call handoff time of the schedule layer. In at least one of the various embodiments, the virtual start time may set to the on-call handoff time that comes directly before the actual start time of the shift. In at least one of the various embodiments, if a virtual start time is in effect, computations used to generate schedule entries for the schedule layer may be based on the virtual start time. For example, if a schedule layer has a shift duration of 24 hours, assuming no restrictions, the each shift for the schedule layer will start at Midnight and end at 11:59 p.m. Thus, in at least one of the various embodiments, if an actual start time of 8:00 a.m. is provided, a virtual start time of 12 Midnight (eight hours earlier than the actual start time) may be generated to align the schedule layer with the on-call handoff time for the schedule layer. Continuing with this example, assuming no restrictions, the first shift may have a virtual start time of Midnight but an actual start time of 8:00 a.m. Consequently, the first team member assigned to a shift for this schedule layer will have a shift that starts at 8:00 a.m. and ends at 11:59 p.m. Further, in at least one of the various embodiments, during the computation of schedule entries and/or final schedule entries, time ranges that fall in between the virtual start time and the actual start time may be discarded.

In at least one of the various embodiments, epochs may be employed in determining the virtual start time for a schedule layer. In at least one of the various embodiments, the initial start time of the schedule layer, or the last known good virtual start time, may be determined as a starting point for computing a new/current virtual start time. From the determined start point, the new virtual start time may be computed by starting at the last known virtual start time and/or the schedule layer's original start time and then jumping forward in time by epochs until the actual start time for the schedule may be reached (or exceeded). From here the virtual start time may set to the previous on-call hand off time (e.g., the wall clock time when the shift would start). In at least one of the various embodiments, computing the new virtual start time by jumping forward in terms of epochs may be advantageous because, otherwise, it may be necessary to compute the team member rotations and/or schedule entries for each entry from the previous start point. In some cases, using the epochs may avoid several months worth of computations.

At block 1104, in at least one of the various embodiments, a cursor may be set to the start time for the next shift (e.g., the next on-call handoff time).

In at least one of the various embodiments, the cursor may be an index, pointer, register, iterator, data structure, or the like, that may be used to track time ranges in a schedule. In at least one of the various embodiments, this cursor may be a temporary value used to hold a time value that corresponds to the start of a shift. The time value may be represented using a variety of time value formats, including, Unix epoch time, or the like.

In at least one of the various embodiments, the next shift start time may be determined based on incrementing the current cursor value based on the shift duration. In at least one of the various embodiments, if this is the first time through the process, the next start time may be the first start time for the schedule layer. In some embodiments, as discussed above, a virtual start time may be calculated to and set to be next on-call handoff time for purposes of computing the time ranges associated with the shift.

At decision block 1106, in at least one of the various embodiments, if there may be one or more restrictions associated with the schedule layer, control may flow to block 1108. Otherwise, in at least one of the various embodiments, control may flow block 1112.

In at least one of the various embodiments, restrictions associated with a schedule layer may affect which schedule entries may be generated from the schedule layer. In at least one of the various embodiments, restrictions define time ranges where the schedule layer should not be active. Restrictions may be defined for various reasons, such as, team member lunch breaks, team member days off, or the like. In at least one of the various embodiments, schedule layers may have more than one restriction where each restriction may represent a different reason for excluding time range from the schedule.

At block 1108, in at least one of the various embodiments, the restrictions may be applied to the current shift. In at least one of the various embodiments, restrictions may create gaps of time in the schedule layer between schedule entries. Restrictions and/or portions of restrictions associated with a schedule layer may demark the one or more time ranges where the schedule layer is active.

In at least one of the various embodiments, if a restriction is determined to occur within the current shift, the scheduling application may determine one or more time ranges based on the restriction.

In at least one of the various embodiments, restrictions impact the schedule entries and team member rotation in different ways depending on the length, start time, and end time of the restriction. In some cases, a restriction may be configured such that it covers an entire shift. For example, if a schedule layer has a 24 hour shifts and a restriction is 72 hours long, depending on the start time of the restriction it will cover at least two shifts plus parts of two shifts (up to a maximum of three shifts if the restriction start time is aligned with the shift start time). In other cases, the beginning and end of restrictions may be contained within a single shift. Or, restriction may cover the start time or end time of a shift.

In at least one of the various embodiments, if applying the restrictions the scheduling application may determine if one or more time ranges in a shift not covered by a restriction are available. For example, if the restriction is in the middle of the shift, the scheduling application may generate two time ranges, and therefore two schedule entries for the shift. One time range representing the time period before the restriction takes effect, and one time range representing the time period after the restriction has ended.

In other cases, if the restriction overlaps either the start or the end of a shift one time range may be generated, and therefore only one schedule entry generated. For example, if the restriction covers the beginning a shift but ends before the end of the shift is reached. Thus, in this example, the schedule entry may be generated such that it starts when the restriction ends and ends at the end of the shift. Likewise, if a restriction starts during a shift but extends beyond the end of the shift only one time range may be needed. Thus, in this example, the time range may be generated such that it starts when the shift starts and ends when the restriction starts.

In at least one of the various embodiments, if the restriction covers the duration of the entire shift then no time ranges, and thus no schedule entries, may be generated for the shift.

In other words, in at least one of the various embodiments, computing the intersection of schedule entry with a restriction may result the schedule entries various outcomes, such as, zero schedule entries (e.g., the schedule entry may be entirely swallowed by the restrictions), one schedule entry (e.g., the schedule entry is unmodified), one schedule entry (e.g., time is knocked off the start or end of the schedule entry), two or more schedule entries (e.g., time is knocked out of the middle of the schedule entry, breaking the shift up into 2 or more parts).

At decision block 1110, in at least one of the various embodiments, if applying the restriction to the shift produces one or more time ranges, control may flow to block 1112. Otherwise, in at least one of the various embodiments, control may flow decision block 1116.

In at least one of the various embodiments, if there may be one or more active time ranges the scheduling application may assign a team member and generate a schedule entry. Otherwise, if the current shift does not include time ranges that it is active, a team member may not be assigned to the current shift.

At block 1112, in at least one of the various embodiments, the current team member may be associated with the current shift. Also, a corresponding schedule entry may be generated and stored. In at least one of the various embodiments, a schedule entry may be generated and a team member may be assigned because there may be at least one time range within the current shift period that is active.

In at least one of the various embodiments, team members may be assigned to shifts that have been determined to include one or more active time ranges. In the absence of restrictions affecting a shift, a schedule entry may be generated that has a time ranges that spans the duration of the shift (e.g., the start time and end time of the schedule entries may be the same as the shift).

In at least one of the various embodiments, if there is more than one time range within the boundary of a single shift, multiple schedule entries may be generated (one for each time range). The same team member may be assigned to each of these schedule entries since they all occur within the same shift.

In at least one of the various embodiments, if schedule entries may start and end in the space of time between the virtual start time and the actual start time they may be discarded. In at least one of the various embodiments, if a schedule entries start time occurs before the actual start time, it the start time may be adjusted to be the actual start time.

At block 1114, in at least one of the various embodiments, the next team member eligible for scheduling may be determined. In at least one of the various embodiments, the process may determine a team member in such a way as to ensure that each team member is associated with at least one schedule entry before the team member is rotated in the team member list. In at least one of the various embodiments, this process may examine the generated schedule entries and test if the current team member may be assigned to at least one schedule entry before advancing/rotating the current member value to another team member.

In at least one of the various embodiments, if any schedule entry was generated for the current shift, the current team member may be advanced to the next team member in the list. Thus, in at least one of the various embodiments, if there may be no schedule entry the current team member may not be advanced.

In at least one of the various embodiments, team members may be arranged in a team list that may be sorted in the order of rotation. In at least one of the various embodiments, a team member may be included more than once in the same team list. Accordingly, the scheduling application may schedule team members that have multiple entries more often. For example, if a team list is arranged as follows: (Adam, Bruce, Charlie, Adam, Bruce, Charlie, Doris) then Adam, Bruce, and Charlie will each be scheduled twice for each time Doris is scheduled. Also, in at least one of the various embodiments, other well-know data structures besides, or in combination with lists may be used to determine the rotation pattern of team members.

At decision block 1116, in at least one of the various embodiments, if the end time value has been reached or exceeded, control may return to a calling process. Otherwise, control may loop back to block 1104.

In at least one of the various embodiments, the schedule application may generate schedule entries for a time period that may be provided in block 1102. Also, the time period may be established based on default values and/or configuration values. For example, the user may be interested in generating schedule entries for the next two weeks. Thus, if the schedule entries for the requested time period have been generated, the process may return control to a calling process. Likewise, if more schedule entries remain to be generated from the schedule layer, the scheduling process may continue processing them.

Figure 12:
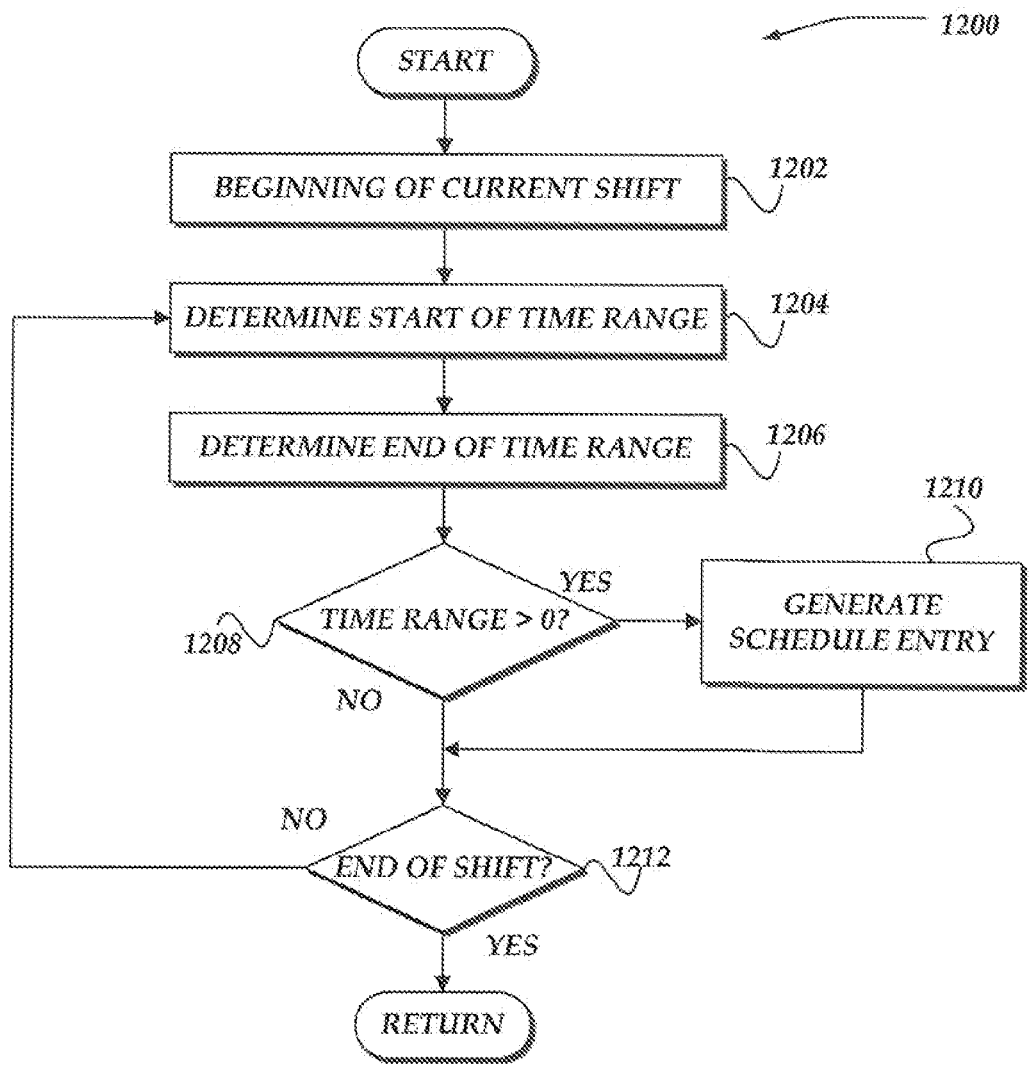
FIG. 12 illustrates a flowchart for a process for generating time ranges and schedule entries using a schedule layer in accordance with at least one of the various embodiments.

FIG. 12 illustrates a flowchart for process 1200 for generating time ranges for schedule entries using a schedule layer in accordance with at least one of the various embodiments. In at least one of the various embodiments, team members may be assigned to schedule entries that have at least one time ranges where they may be considered to be active and/or on-call.

After a start block, at block 1202, in at least one of the various embodiments, the beginning of the current shift may be determined. In at least one of the various embodiments, the start of the current shift may be an actual start time or it may be a virtual start time. The shift may be determined from a schedule layer that is currently being processed by the scheduling application.

At block 1204, in at least one of the various embodiments, the start of a time range may be determined. In at least one of the various embodiments, if there is not a restriction associated with the current shift, the time range start time may be same as the shift start time. In at least one of the various embodiments, if a virtual start time is associated with the current shift, the actual shift start time may be used to determine the start time for the time range.

In at least one of the various embodiments, if a restriction covers the beginning of the current shift, the start time of the time range may be adjusted to be the same as the end time of the restriction (assuming the restriction ends inside the current shift). In at least one of the various embodiments, if the entire shift is covered by a restriction, a start time for the time range may undefined and the time range may be determined to be empty, zero length, null, or the like.

At block 1206, in at least one of the various embodiments, the end of the time range may be determined using logic similar to how the start time of the time range may be determined.

In at least one of the various embodiments, the end time of the time range may be determined to be the time where a restriction begins, or where the shift ends. If there is no intervening restriction the end of the time range may coincide with the end of the current shift.

In at least one of the various embodiments, if the entire shift duration is covered by a restriction, the end time for the time range may be undefined and the time range may be determined to be empty, zero length, null, or the like.

In at least one of the various embodiments, additional considerations for determining the start or end of the time range may include time zone changes, Daylight Saving Time (DST), or the like, or combination thereof.

In at least one of the various embodiments, if DST changes occur during the schedule period, generated time ranges may be lengthened or shortened as appropriate to accommodate the clock time adjustment the correspond to DST. For example, in Fall DST may require adjusting clock time back one hour. Thus, if DST requires that the clocks should be adjusted back one hour, the time range may be extended to accommodate the adjustment. This may cause the team member to be on-call an additional hour, but the shifts will otherwise remain in alignment.

To clarify, in at least one of the various embodiments, process 1200 may ensure that a shift's on-call handoff time happens at the same time even through DST changes. So, if the handoff may be configured to happen every day at Noon, then the schedule entry duration may be adjusted to enable the on-call handoff time to be the same time (Noon) both before and after a DST shift.

At decision block 1208, in at least one of the various embodiments, if the duration of the time range is greater than zero, control may flow block 1210. Otherwise, control may flow to decision block 1212. Also, in at least one of the various embodiments, if the time range may be determined empty, null, zero length, control may flow to decision block 1212.

In at least one of the various embodiments, the absence of time ranges having durations greater than zero indicates that the shift may be completely covered by restrictions. Accordingly, it is unnecessary generate a schedule entry that assigns a team member to the shift.

At block 1210, in at least one of the various embodiments, a schedule entry that includes the time range may be generated and the current team member may be assigned to the new schedule entry.

At decision block 1212, in at least one of the various embodiments, if the end of the shift is reached, control may flow to block 1214. Otherwise, control may loop back to block 1204.

In at least one of the various embodiments, the decision block may test if schedule entries have been generated for all of the active portions of the current shift. If so, then the processing for the current shift has completed.

In at least one of the various embodiments, shifts that may be completely covered by restrictions may pass through without causing a schedule entry to be generated.

Figure 13:
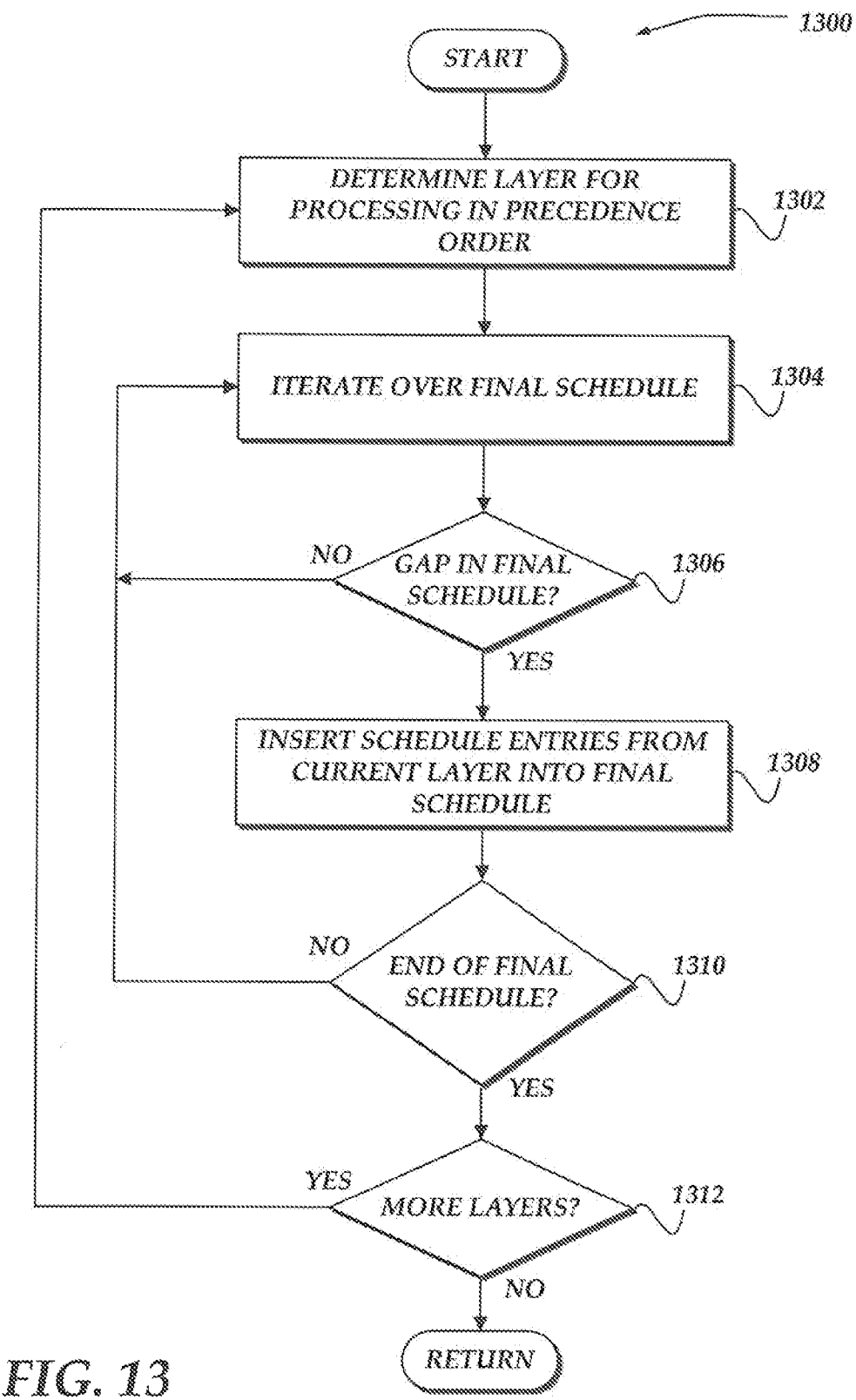
FIG. 13 illustrates a flowchart for a process for generating a final schedule from one or more schedule layers in accordance with at least one of the various embodiments.

FIG. 13 illustrates a flowchart for process 1300 for generating a final schedule from one or more schedule layers in accordance with at least one of the various embodiments.

In at least one of the various embodiments, final schedules may be produced from multiple schedule layers. In at least one of the various embodiments, the schedule entries from each schedule layer are compared to produce one or more final schedule entries that may be used to generate the final schedule. Final schedule entries in the final schedule may not overlap. In at least one of the various embodiments, schedule entry time ranges from lower precedent schedule layers may be adjusted (truncated) to avoid conflicting with schedule entries provided by higher precedent schedule layers.

After a start block, at block 1302, in at least one of the various embodiments, the schedule layers associated with a schedule may be arranged in precedence order based on their precedent value and the highest precedence schedule layer may be determined. In at least one of the various embodiments, if two schedule layers provide conflicting schedule entries the higher precedent schedule layer's time ranges may be used to produce the final schedule entry that may be added to the final schedule over the lower precedent schedule layer.

In at least one of the various embodiments, a schedule may include an override schedule layer that may be the highest precedent schedule layer. In at least one of the various embodiments, if there is an override schedule layer it may be processed first.

At block 1304, in at least one of the various embodiments, the process may iterate over the final schedule to identify gaps in that have not been assigned a final schedule entry. Accordingly, in at least one of the various embodiments, at the start of the process the final schedule may be empty of final schedule entries. Thus, in at least one of the various embodiments, the first time through the process the final schedule may be empty of final schedule entries.

In at least one of the various embodiments, the final schedule may be generated by iterating in time order across the schedule period. In at least one of the various embodiments, schedule entries generated based on the schedule layers may be used to generate final schedule entries that may be assigned to the final schedule.

At decision block 1306, in at least one of the various embodiments, if a gap in the final schedule may be identified, control may flow to block 1308. Otherwise, in at least one of the various embodiments, control may loop back to block 1304 to continue iterating over the final schedule.

In at least one of the various embodiments, a gap in the final schedule may be period of time in the schedule without a final schedule entry assigned to it. In at least one of the various embodiments, if the current schedule layer is the first schedule layer to be processed, the entire final schedule may be empty.

Otherwise, if the current schedule layer is not the first schedule layer then at least one higher precedent schedule layer may have been processed. Thus, there may be one or more final schedule entries generated based on higher precedent schedule layers in the final schedule. But, in at least one of the various embodiments, the previous schedule layers may have left some gaps in the final schedule. Thus, the scheduling application may be seeking gaps in the final schedule where the lower precedent schedule layers may provide final schedule entries.

At block 1308, in at least one of the various embodiments, if a gap in the final schedule was determined, schedule entries generated from the current schedule layer may be used to generate final schedule entries that may be inserted into the final schedule.

In at least one of the various embodiments, the current schedule layer may be analyzed to determine if it has schedule entries that may added to the final schedule. If relevant schedule entries may be available, they may be used to generate one or more final schedule entries in the final schedule.

However, in at least one of the various embodiments, just because there is a gap in the final schedule does not guarantee that the current schedule layer has an applicable schedule entry. For example, a gap in final schedule that includes all day Monday may be discovered. But if the current schedule layer just has schedule entries for Wed through Friday, it will be unable to provide schedule entries to fill the Monday gap. But if the above example the gap in the final schedule goes from Monday to Thursday, schedule entries from the current schedule layer may be used to provide final schedule entries to cover Tuesday through Thursday.

In at least one of the various embodiments, if the current schedule layer has applicable schedule entries the scheduling application may attempt to fill as much of the gap as possible using the current schedule layer.

Likewise, in at least one of the various embodiments, if the gap in the final schedule is smaller (e.g., has a shorter duration) than the corresponding layer schedule entry, the time range of schedule entry provided by the current layer may be truncated as necessary to generate a final schedule entry that may fit into the gap. In at least one of the various embodiments, this process may be similar to the process that happens if truncating a schedule entry to take a restriction into account. In both cases, in at least one of the various embodiments, the process may compute the intersection between a schedule entry and a gap (either in the final schedule, or in the restriction sub-layer). For example, if the gap in the final schedule is eight hours and each schedule entry in the current layer is 24 hours, the current layer may contribute an eight hour long schedule entry to the final schedule. In this example, the 24 hour schedule entry from the current schedule layers may have its start and stop time adjusted to fit within the available eight hour time window. Likewise, a team member assigned to a 24 hour shift at the current schedule layer will be on-call for just eight hours based on the resulting final schedule.

At decision block 1310, in at least one of the various embodiments, if the end of the final schedule has been reached, control may flow to decision block 1312. Otherwise, in at least one of the various embodiments, control may loop back block 1304 to continue iterating over the final schedule period.

At decision block 1312, in at least one of the various embodiments, if all the schedule layers associated with the schedule have been processed, control may be returned to a calling process. Otherwise, in at least one of the various embodiments, control may loop back to block 1302 to process the next available schedule layer.

Also, in at least one of the various embodiments, if all the gaps in the final schedule have been filled, control may be returned to a calling process since the remaining lower precedent schedule layers may be restricted from displacing schedule entries provided by higher precedent schedule layers.

In at least one of the various embodiments, at the completion of the merging process, the final schedule will comprise one or more final schedule entries derived from the schedule entries of the schedule layers. In at least one of the various embodiments, each final schedule entry in the final schedule may have a definite start time and a definite end time and be assigned a specific team member (or conceivably more than one team member).

Figure 14:
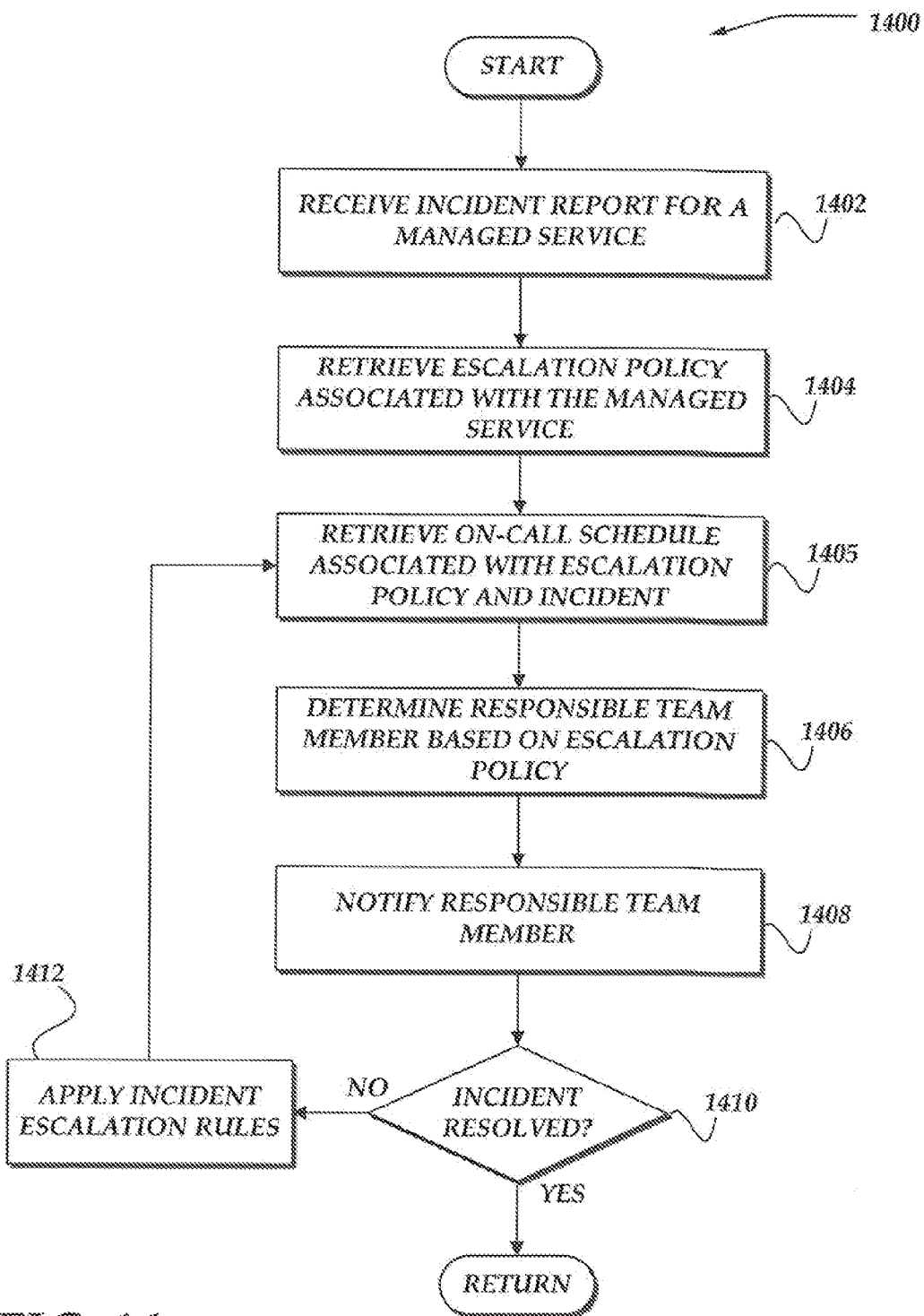
FIG. 14 illustrates a flowchart for a process for processing incidents provided to a schedule management interface in accordance with at least one of the various embodiments.

FIG. 14 illustrates a flowchart for process 1400 for processing incidents provided to a schedule management interface in accordance with at least one of the various embodiments. After a start block, at block 1402, in at least one of the various embodiments, one or more incident reports may be received for one or more services that may be managed and/or monitored one or more components, such as, notification engine 362.

At block 1404, in at least one of the various embodiments, one or more escalation policies that may be associated with the service corresponding to the incident alert may be retrieved. In at least one of the various embodiments, the escalation policies may be retrieved from a storage system such as a database or file system. In other embodiments, the schedule may be in memory and/or stored in a memory cache.

In at least one of the various embodiments, each escalation policy may be associated with one or more schedules.

At block, 1405, in at least one of the various embodiments, the schedule that may be associated with the incident's current escalation level and the escalation policy corresponding to this incident may be retrieved.

At block 1406, in at least one of the various embodiments, the team member responsible for handling the incident (e.g., the on-call team member) may be determined based on the escalation policy and at least the final schedule entries corresponding to the final schedule of the first schedule included in the escalation policy. E.g., the final schedule entry corresponding to the time of the incident may be determined and from the final schedule entry information the appropriate team member may be determined. In at least one of the various embodiments, the time that notification time is received may be employed to determine the appropriate final schedule entry to use to respond to the notification.

At block 1408, in at least one of the various embodiments, the responsible team member may be notified of the incident report. In at least one of the various embodiments, team members may be associated with one or more notification policies that may be employed to determine the notification process for the responsible team member.

In at least one of the various embodiments, team members may establish a profile that includes the information necessary to use notification methods they prefer. In at least one of the various embodiments, the team member profile may include rules for determining from among various notification methods. Such rules may take into account various factors, such as, time-of-day, severity of the underlying incident, the service associated with the incident, number times notified (e.g., the first notification may use email but the second notification may use SMS), or the like, or combination thereof.

In at least one of the various embodiments, responsible team members may be notified more than one time for the same incident. In at least one of the various embodiments, multiple notifications may occur if the incident remains unresolved.

In at least one of the various embodiments, if a responsible team member fails to acknowledge the receipt of the incident notification before the expiration of a configured timeout, the process may generate another notification. In some embodiments, if the incident is not acknowledged before the timeout, the process may escalate the incident based on the current escalation policy associated with the incident.

In at least one of the various embodiments, some incident report providers may send multiple incident reports for what amounts to being just one problem. Accordingly, team members may define a policy rule that limits that number of notifications to send for a given incident report.

At decision block 1410, in at least one of the various embodiments, if the incident is resolved, control may be returned to a calling process. Otherwise, in at least one of the various embodiments, control may move to block 1412 to process applicable escalation rules.

In at least one of the various embodiments, team members may be able to directly provide status and information reports regarding an incident report. In other cases, the incident report may have been generated from a monitoring application separate from the schedule management interface. Likewise the same separate monitoring application may provide a communication to the notification engine that indicates the status of incident (e.g., it is resolved or not).

In at least one of the various embodiments, some incident reports may be configured to be self-resolving. In other words, the incident report may be cause a notification to be generated but the system that generated the report may not track and/or care about the resolution of the incident.

At block 1412, in at least one of the various embodiments, escalation rules based on business rules and/or policies that may be associated with the service, schedule, or incident report may be applied to determine the escalation actions, if any, to perform. Escalation rules may include notifying additional and/or different team members. Also, users other than team members may be notified based on the escalation rules. For example, an escalation rule may enable a senior manager who is not included as a team member to be notified for certain kinds of incident reports.

In at least one of the various embodiments, escalation rules and escalation actions may be tied to how long it is taking to resolve the incident. Thus, one or more time thresholds may defined as part of the escalations rules. For example, if the duration an incident remains unresolved exceeds a defined threshold actions may be taken such as notifying additional team members.

In at least one of the various embodiments, escalation policies may trigger additional incident reports to be generated. These additional incidents may enter the system through block 1402 and be processed similar to other incident reports.

In at least one of the various embodiments, if the incident remains unacknowledged by a responsible team member beyond the timeout value associated with that step in the escalation policy, or the contacted user explicitly requests it, the process may advance to the next step in the escalation policy. In at least one of the various embodiments, this may involve retrieving another schedule, and once again looking up the on call person by repeating the block 1405 against the new schedule.

In at least one of the various embodiments, this may continue until there are either no more steps or the incident is acknowledged or resolved. Optionally, in at least one of the various embodiments, instead of terminating the escalation process at the end of the escalation policy, the notification process may loop back to the first step in the escalation policy.

In at least one of the various embodiments, an incident may be considered resolved (either manually or automatically) if the problem may be deemed solved or the incident may be identified as a "false alarm". If an incident is resolved, it stops generating alerts.

In contrast, in at least one of the various embodiments, an incident may be considered to be acknowledged by a person if they indicate that they are aware of the problem and have begun working on a resolution, but in the mean time, the underlying error condition may still exist.

In at least one of the various embodiments, if an incident is acknowledged, it may be need to be periodically re-acknowledged or the process may resume sending the alerts about the incident. In at least one of the various embodiments, the alerts may go to the last person who was assigned the incident (usually, but not necessarily, the person who acknowledged it in the first place). In at least one of the various embodiments, if an incident report/alert remains unacknowledged beyond the timeout specified by the escalation policy, it may escalate just as it would have had it never been acknowledged to begin with.

Next, in at least one of the various embodiments, control may loop back to determining additional actions such as determining another team member to notify about the incident alert.

Figure 15:
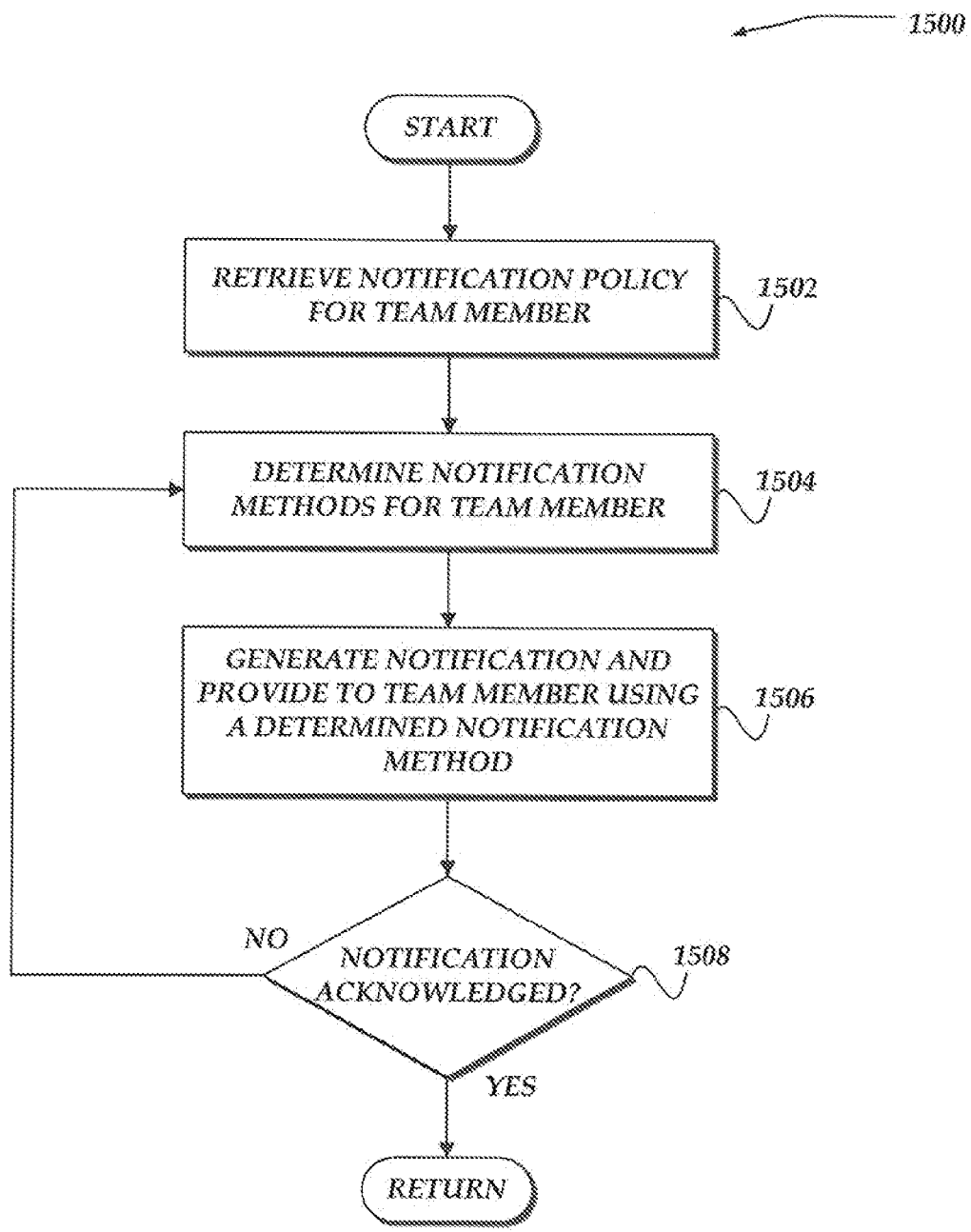
FIG. 15 illustrates a flowchart for a process for generating notifications to team members in accordance with at least one of the various embodiments.

FIG. 15 illustrates a flowchart for process 1500 for generating notifications in accordance with at least one of the various embodiments. After a start block, at block 1502, in at least one of the various embodiments, one or more notification policies that may be associated with a responsible team member may be generated and/or retrieved. In at least one of the various embodiments, the notification policies may be stored using well-known data structures stored in databases, file systems, memory, caches, or the like.

At block 1504, in at least one of the various embodiments, the notification methods that may be available for the responsible team member may be determined. In at least one of the various embodiments, each team member may have notification profiles that include information that may be used for notifying them, such as, email address, phone numbers, or the like. These profiles may also include the team member's preferences for when and how to be notified.

At block 1506, in at least one of the various embodiments, a notification communication such as a message and/or event appropriate for the determined notification method and the incident report may be generated. In at least one of the various embodiments, the notification method may be employed to provide/communicate the notification message to the responsible team member. In at least one of the various embodiments, the notification message may include an identifier that corresponds with the underlying incident report. The identifier may be used to associate the notification message with the underlying incident report.

At decision block 1508, in at least one of the various embodiments, if the notification communication is acknowledged as having been received by the responsible team member, control may return to a calling process. Otherwise, in at least one of the various embodiments, control may loop back to block 1504.

In at least one of the various embodiments, the escalation policy may be arranged to include one or more time delays. For example, in at least one of the various embodiments, a user may be enabled to specify how long the system should wait for an acknowledgment from a notified team member before the system goes on to send additional notifications (potentially, but not necessarily, of a different type).

In at least one of the various embodiments, some notification methods may not support and/or require express acknowledgment of the receipt of a notification message depending on the particular communication protocol that is being used to generate the notification communication.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

What is claimed as new and desired to be protected by Letters Patent of the United States is:

1. A method for managing schedules over a network using a network computer, comprising:
   wherein the network computer performs actions, including:
      generating at least one schedule layer that includes at least a start time, a shift duration, a precedence value, and at least one team member;
      generating at least one schedule entry for each schedule layer, wherein the at least one schedule entry includes a team member and a time range;
      comparing each schedule entry to each other schedule entry for all schedule layers based on an ordering of each precedence value for each schedule layer;
      determining at least one final schedule entry based on at least one compared schedule entry that corresponds to a schedule layer having a highest ordering, wherein the at least one final schedule entry includes at least a portion of the time range and the team member that corresponds to the at least one compared schedule entry;
      generating a final schedule based on the at least one final schedule entry for each team member that corresponds to the at least one compared schedule entry; and
      generating a plurality of epochs based on each equivalent time period within the final schedule where the same allocation of team members in the final schedule repeats, wherein jumping forward in time by each repeated epoch at least provides reduced computation of at least a virtual start time.

2. The method of claim 1, further comprising, generating at least one restriction that is included with the at least one schedule layer.

3. The method of claim 1, further comprising, generating at least one override schedule layer having a highest precedence value.

4. The method of claim 1, wherein generating the at least one schedule entry, further comprises, modifying the time range based on the virtual start time.

5. The method of claim 1, further comprising, if an end of the shift duration is reached for a schedule layer and a current team member is assigned to at least one schedule entry that corresponds to a portion of the at least one shift duration, rotating a next team member of the schedule layer to be the current team member for another portion of the at least one shift duration.

6. The method of claim 1, further comprising, determining a responsible team member based on the final schedule and a time of occurrence of a reported incident.

7. The method of claim 1, further comprising, providing at least one notification to at least one responsible team member based on a reported incident, wherein the responsible team member is determined based on a time that the incident is reported.

8. The method of claim 1, further comprising, communicating with at least one monitoring service, wherein the at least one monitoring service provides incident reports.

9. A system arranged for managing schedules over a network, comprising:
   a server device, including:
      a transceiver that is operative to communicate over the network;
      a non-transitive memory that is operative to store at least instructions; and
      a processor device that is operative to execute instructions that provide actions, including:
         generating at least one schedule layer that includes at least a start time, a shift duration, a precedence value, and at least one team member;
         generating at least one schedule entry for each schedule layer, wherein the at least one schedule entry includes a team member and a time range;
         comparing each schedule entry to each other schedule entry for all schedule layers based on an ordering of each precedence value for each schedule layer;
         determining at least one final schedule entry based on at least one compared schedule entry that corresponds to a schedule layer having a highest ordering, wherein the at least one final schedule entry includes at least a portion of the time range and the team member that corresponds to the at least one compared schedule entry;
         generating a final schedule based on the at least one final schedule entry for each team member that corresponds to the at least one compared schedule entry; and
         generating a plurality of epochs based on each equivalent time period within the final schedule where the same allocation of team members in the final schedule repeats, wherein jumping forward in time by each repeated epoch at least provides reduced computation of at least a virtual start time; and
   a client device, comprising,
      a transceiver that is operative to communicate over the network;
      a non-transitive memory that is operative to store at least instructions; and
      a processor device that is operative to execute instructions that provide actions, including:
         displaying at least a portion of the final schedule; and
         displaying at least one notification to the at least one team member.

10. The system of claim 9, further comprising, generating at least one restriction that is included with the at least one schedule layer.

11. The system of claim 9, further comprising, generating at least one override schedule layer having a highest precedence value.

12. The system of claim 9, wherein generating the at least one schedule entry, further comprises, modifying the time range based on the virtual start time.

13. The system of claim 9, further comprising, if an end of the shift duration is reached for a schedule layer and a current team member is assigned to at least one schedule entry that corresponds to a portion of the at least one shift duration, rotating a next team member of the schedule layer to be the current team member for another portion of the at least one shift duration.

14. The system of claim 9, further comprising, determining a responsible team member based on the final schedule and a time of occurrence of a reported incident.

15. The system of claim 9, further comprising, providing at least one notification to at least one responsible team member based on a reported incident, wherein the responsible team member is determined based on a time that the incident is reported.

16. The system of claim 9, further comprising, communicating with at least one monitoring service, wherein the at least one monitoring service provides incident reports.

17. A network device that is operative for managing schedules, comprising:
- a transceiver that is operative to communicate over a network;
- a non-transitive memory that is operative to store at least instructions; and
- a processor device that is operative to execute instructions that provide actions, including:
  - generating at least one schedule layer that includes at least a start time, a shift duration, a precedence value, and at least one team member;
  - generating at least one schedule entry for each schedule layer, wherein the at least one schedule entry includes a team member and a time range;
  - comparing each schedule entry to each other schedule entry for all schedule layers based on an ordering of each precedence value for each schedule layer;
  - determining at least one final schedule entry based on at least one compared schedule entry that corresponds to a schedule layer having a highest ordering, wherein the at least one final schedule entry includes at least a portion of the time range and the team member that corresponds to the at least one compared schedule entry;
  - generating a final schedule based on the at least one final schedule entry for each team member that corresponds to the at least one compared schedule entry; and
  - generating a plurality of epochs based on each equivalent time period within the final schedule where the same allocation of team members in the final schedule repeats, wherein jumping forward in time by each repeated epoch at least provides reduced computation of at least a virtual start time.

18. The network device of claim 17, further comprising, generating at least one restriction that is included with the at least one schedule layer.

19. The network device of claim 17, further comprising, generating at least one override schedule layer having a highest precedence value.

20. The network device of claim 17, wherein generating the at least one schedule entry, further comprises, modifying the time range based on the virtual start time.

21. The network device of claim 17, further comprising, if an end of the shift duration is reached for a schedule layer and a current team member is assigned to at least one schedule entry that corresponds to a portion of the at least one shift duration, rotating a next team member of the schedule layer to be the current team member for another portion of the at least one shift duration.

22. The network device of claim 17, further comprising, determining a responsible team member based on the final schedule and a time of occurrence of a reported incident.

23. The network device of claim 17, further comprising, providing at least one notification to at least one responsible team member based on a reported incident, wherein the responsible team member is determined based on a time that the incident is reported.

24. A processor readable non-transitive storage media that includes instructions for managing schedules, wherein execution of the instructions by a processor device enables actions, comprising:
- generating at least one schedule layer that includes at least a start time, a shift duration, a precedence value, and at least one team member;
- generating at least one schedule entry for each schedule layer, wherein the at least one schedule entry includes a team member and a time range;
- comparing each schedule entry to each other schedule entry for all schedule layers based on an ordering of each precedence value for each schedule layer;
- determining at least one final schedule entry based on at least one compared schedule entry that corresponds to a schedule layer having a highest ordering, wherein the at least one final schedule entry includes at least a portion of the time range and the team member that corresponds to the at least one compared schedule entry;
- generating a final schedule based on the at least one final schedule entry for each team member that corresponds to the at least one compared schedule entry; and
- generating a plurality of epochs based on each equivalent time period within the final schedule where the same allocation of team members in the final schedule repeats, wherein jumping forward in time by each repeated epoch at least provides reduced computation of at least a virtual start time.

25. The media of claim 24, further comprising, generating at least one restriction that is included with the at least one schedule layer.

26. The media of claim 24, further comprising, generating at least one override schedule layer having a highest precedence value.

27. The media of claim 24, wherein generating the at least one schedule entry, further comprises, modifying the time range based on the virtual start time.

28. The media of claim 24, further comprising, if an end of the shift duration is reached for a schedule layer and a current team member is assigned to at least one schedule entry that corresponds to a portion of the at least one shift duration, rotating a next team member of the schedule layer to be the current team member for another portion of the at least one shift duration.

29. The media of claim 24, further comprising, determining a responsible team member based on the final schedule and a time of occurrence of a reported incident.

30. The media of claim 24, further comprising, providing at least one notification to at least one responsible team member based on a reported incident, wherein the responsible team member is determined based on a time that the incident is reported.

* * * * *